United States Patent [19]

Lee

[11] Patent Number: 5,341,289

[45] Date of Patent: Aug. 23, 1994

[54] METHOD FOR CONTROLLING THREE DEGREE OF FREEDOM ACTUATOR SYSTEM

[75] Inventor: Jason J. Lee, Danbury, Conn.

[73] Assignee: United Parcel Service of America, Inc., Atlanta, Ga.

[21] Appl. No.: 14,331

[22] Filed: Feb. 5, 1993

Related U.S. Application Data

[62] Division of Ser. No. 906,205, Jun. 25, 1992.

[51] Int. Cl.⁵ ............................................. G06F 15/46
[52] U.S. Cl. ........................... 364/167.01; 318/568.23; 395/88; 395/97
[58] Field of Search ................... 364/167.01, 191–193, 364/474.35, 559, 478; 395/80, 85, 86, 88, 89, 93, 97, 98; 318/568.21, 568.22, 568.23, 568.13, 568.14, 568.19; 901/3–5, 9, 29

[56] References Cited

U.S. PATENT DOCUMENTS

| | | | |
|---|---|---|---|
| 3,841,499 | 10/1974 | Bullard | 414/776 |
| 3,888,362 | 6/1975 | Fletcher et al. | 414/620 |
| 4,068,156 | 1/1978 | Johnson et al. | 318/575 |
| 4,068,763 | 1/1978 | Fletcher et al. | 414/4 |
| 4,132,318 | 1/1979 | Wang et al. | 414/591 |
| 4,140,953 | 2/1979 | Dunne | 395/92 |
| 4,229,136 | 10/1980 | Panissidi | 414/673 |
| 4,295,771 | 10/1981 | Mehesan, Jr. | 414/5 |
| 4,300,362 | 11/1981 | Lande et al. | 464/117 |
| 4,402,234 | 9/1983 | Malarz et al. | 74/417 |
| 4,511,305 | 4/1985 | Kawai et al. | 414/735 |
| 4,576,544 | 3/1986 | Passemard et al. | 414/735 |
| 4,610,597 | 9/1986 | Wright | 414/729 |
| 4,623,971 | 11/1986 | Ailman et al. | 364/167.01 X |
| 4,642,540 | 2/1987 | LeMay | 318/568.13 |
| 4,686,866 | 8/1987 | Rosheim | 74/479 R |
| 4,698,572 | 10/1987 | Stone | 395/89 |
| 4,748,867 | 6/1988 | Susnjara | 74/479 R |
| 4,794,547 | 12/1988 | Nishida | 395/97 |
| 4,848,179 | 7/1989 | Ubhayakar | 74/479 R |
| 4,887,222 | 12/1989 | Miyake et al. | 395/98 |
| 4,894,788 | 1/1990 | Stelzer | 395/98 |
| 4,912,753 | 3/1990 | Evans, Jr. | 364/167.01 X |
| 4,920,500 | 4/1990 | Hetland et al. | 395/86 |
| 4,975,856 | 12/1990 | Vold et al. | 395/98 |
| 5,114,300 | 5/1992 | Shahinpoor et al. | 414/729 |

FOREIGN PATENT DOCUMENTS 3138220  6/1991  Japan .

OTHER PUBLICATIONS

"A Novel Design for a Robot Arm," E. F. Fichter and E. D. McDowell, Advances in Computer Technology, The International Computer Technology Conference, ASME Century 2—Emerging Technology Conferences, Aug., 1980, pp. 250–256.

"Kinematic Analysis of a Three Degrees of Freedom In-Parallel Actuated Manipulator," Kok-Meng Lee and Dharmen K. Shah, IEEE Journal of Robotics and Automation, vol. 4, No. 3, pp. 361–367, Jun. 1988.

"Kinematics of a Hybrid Series-Parallel Manipulation System," K. J. Waldron, M. Raghavan, and B. Roth, June 1989, Journal of Dynamic Systems, Measurement, and Control, vol. 111, pp. 211–221.

(List continued on next page.)

Primary Examiner—Joseph Ruggiero
Attorney, Agent, or Firm—Steve Mendelsohn; Robert Rosenthal; William H. Murray

[57] ABSTRACT

A method of determining the current orientation of the wrist output of a closed-loop robot wrist having at least one actuator, where the actuator has a displacement sensor, includes generating a look-up table having table orientation data corresponding to the orientation of the wrist output for specific table displacement values of the displacements of the actuator. The method generates displacement signals representative of the displacement of said actuator; selects from the look-up table a set of table orientation data as determined from the displacement signals; and determines the current orientation of the wrist output from that set of table orientation data. Analysis of an equivalent open-loop mechanical model of at least one link of the closed-loop wrist may be used to generate the look-up table.

21 Claims, 11 Drawing Sheets

OTHER PUBLICATIONS

"Singularity Analysis of Closed-Loop Kinematic Chains,"0 Clement Gosselin and Jorge Angeles, IEEE Transactions on Robotics and Automation, vol. 6, No. 3, pp. 281-290, Jun. 1990.

"The Optimum Kinematic Design of a Spherical Three-Degree of -Freedom Parallel Manipulator,"0 C. Gosselin and J. Angeles, Transactions of the ASME, vol. 111, pp. 202-207, Jun. 1989.

"Rate Kinematics of In-parallel Manipulation Systems," Suni K. Agrawal, Proceedings of the 1990 IEEE Int'l Conference on Robotics and Automation, 1990, pp. 104-109.

"Kinematic Inversion of Redundant Parallel Manipulators,"0 C. Gosselin and J. Angeles 1988 ASME Design Technology Conferences—20th Biennial Mechanisms Conference, pp. 253-259, 1988.

"Characteristics and Mechanism Analysis of Parallel Link Manipulator," Tatsuo Arai and Thomas B. Sheridan, 2nd IFAC Symposium, pp. 119-124, 1989.

"Kinematics of Parallel Manipulators with a Positional Subchain," Chang-de Zhang and Shin-Min Song, ASME 21st Biennial Mechanism Conference, pp. 271-278, 1990.

"Characterization of Workspaces of Parallel Manipulators," Vijay Kumar, ASME 21st Biennial Mechanism Conference, 1990.

"Direct Kinematic Solution of a Steward Platform," Prabjot Nanua and Kenneth J. Waldron, IEEE Trans. on Robotics and Automation, vol. 6, No. 4, 1990, pp. 438-444.

METHOD FOR CONTROLLING THREE DEGREE OF FREEDOM ACTUATOR SYSTEM

This is a division of copending application Ser. No. 07/906,205 filed on Jun. 25, 1992.

BACKGROUND OF THE INVENTION

1. Field of the Invention

The present invention is a robotic actuator system that controls orientation, and, in particular, control methods for a robot wrist for supporting and orienting packages in the field of package shipping.

2. Statement of Related Art

In the field of package shipping, packages need to be stacked one on top of another in shipping containers and trucks for transporting between locations. These packages must also be removed one at a time from the those stacks when destinations are reached. These packages, which vary in size and weight, must be stacked and unstacked quickly and safely. Theoretically, mechanical robots may perform these stacking and unstacking functions.

Conventional anthropomorphic robots contain robot "arms," "wrists," and "hands" that perform, respectively, the functions of positioning, orienting, and gripping associated with human arms, wrists, and hands. In controlling a robot system, a controller must be provided to convert the positions of packages in a stack, or the desired location of packages in a stack, in a first coordinate system, to the location of motors in the robot arm and robot wrist, in a second coordinate system. In conventional robot systems, robot wrists are open-loop mechanical systems that provide orientation capability through a wide range of angular displacements. As open-loop systems, these robot wrists have kinematic linearity that permits straightforward closed-form solutions to problems of robot control. Such straightforward solutions are relatively capable of being achieved in real time.

Conventional open-loop wrists cannot handle the large payloads required during package handling in the field of package shipping. As a result, conventional open-loop robot wrists are not suitable for stacking and unstacking packages in the field of package shipping.

It is accordingly an object of the invention to provide a small and light robot wrist that can handle large payloads quickly, safely, and accurately, and be controlled using real-time processing.

It is a further object of this invention to provide a method of controlling a closed-loop robot wrist in real time.

Additional objects and advantages of the invention will become apparent from the detailed description of a preferred embodiment which follows.

SUMMARY OF THE INVENTION

The present invention is a method of determining the current orientation of the wrist output of a closed-loop robot wrist having at least one actuator, where the actuator has a displacement sensor. This method involves generating a look-up table having table orientation data corresponding to the orientation of the wrist output for specific table displacement values of the displacements of the actuator. The method generates displacement signals representative of the displacement of said actuator; selects from the look-up table a set of table orientation data as determined from the displacement signals; and determines the current orientation of the wrist output from that set of table orientation data.

The present invention also covers a method of controlling the wrist output of a closed-loop robot wrist having at least one actuator, where the actuator has a displacement sensor. This method involves generating a look-up table having table orientation data corresponding to the orientation of the wrist output for specific table displacement values of the displacements of the actuator. The method also generates displacement signals representative of the displacement of the actuator; selects from the look-up table a set of table orientation data as determined from the displacement signals; determines the current orientation of the wrist output from the set of table orientation data; and controls the orientation of the wrist output based on that current orientation.

In addition, the present invention is a method of controlling the wrist output of a closed-loop robot wrist having at least one actuator. This method involves generating an equivalent mechanical model that corresponds to the closed-loop robot wrist and has at least one mechanical link. The method also involves generating an equivalent open-loop mechanical model corresponding to at least one mechanical link of that equivalent mechanical model. The method performs kinematic analysis on the equivalent open-loop mechanical model to control the wrist output.

The robot wrist and the associated methods of the present invention solve certain problems involved in handling packages in the field of package shipping. The closed-loop structure of the wrist supports the large payloads that are beyond the capability of conventional robot wrists. Moreover, the methods of the present invention associated with the robot wrist provide the capabilities of controlling the robot wrist for practical applications in the field of package shipping. The methods of the present invention reduce the complexity of the control computations while retaining sufficient accuracy to make feasible precise positioning during real-time control of quick and safe operations of the robot wrist of the present invention.

DETAILED DESCRIPTION OF THE INVENTION

Figure 1:
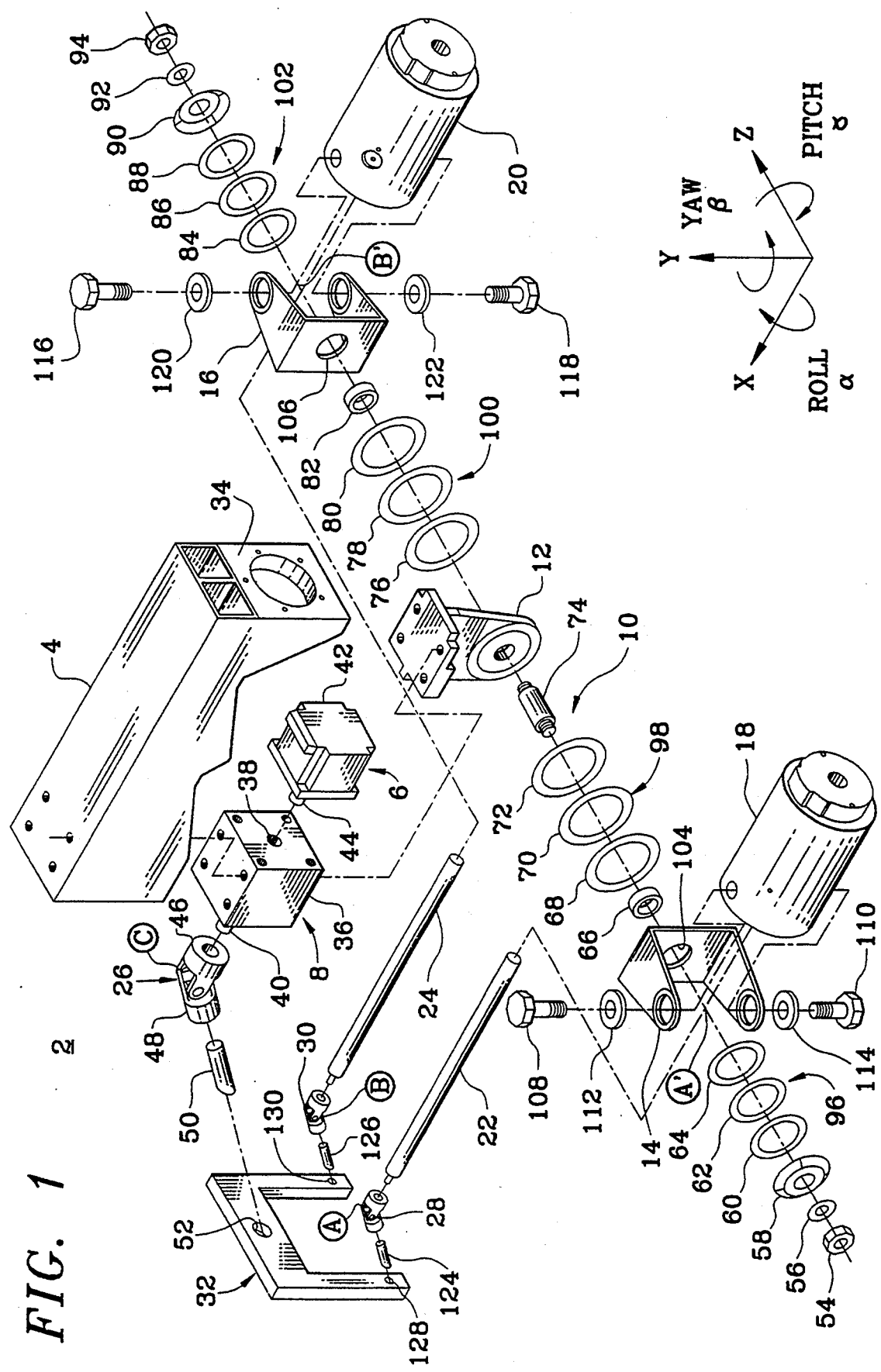
FIG. 1 is an exploded perspective view of the wrist of the present invention.
Figure 2:
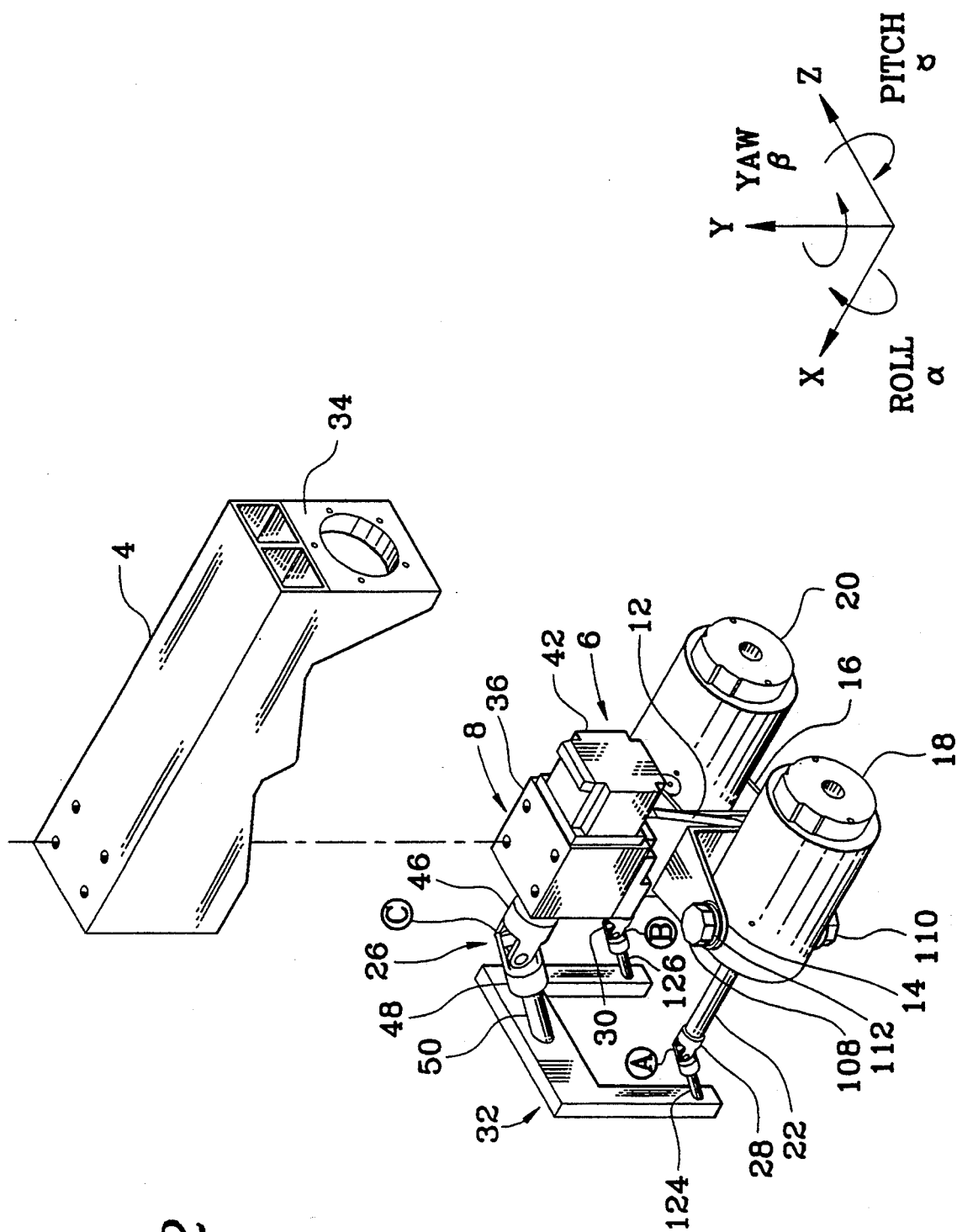
FIG. 2 is a perspective view of the assembled wrist of FIG. 1 with the wrist housing removed.

Referring to FIG. 1, there is shown an exploded perspective view of wrist 2 of the present invention. FIG. 2 presents a perspective view of wrist 2 partially assembled. In a preferred embodiment, wrist 2 is part of an anthropomorphic robot used to stack and unstack packages. To perform these tasks, the robot must be able to grasp, lift, position, and orient those packages. Wrist 2 acts as the "wrist" of the robot and forms the interface between a robot "arm" and a robot "hand." Wrist 2 primarily performs the orienting function, while the robot arm and hand primarily perform the positioning and grasping functions, respectively. Wrist 2 supports the loads exerted by the packages being moved by the robot.

Wrist 2 provides rotational movement of wrist output plate 32 with respect to wrist housing 4. Wrist housing 4, which serves as the mechanical input of wrist 2, is rigidly mounted to the mechanical output of the robot arm (not shown). Wrist output plate 32 acts as the mechanical output of wrist 2 and is rigidly mounted to the mechanical input of the robot hand (not shown). The rotational motion of wrist output plate 32 relative to wrist housing 4 is provided through the three mechanical links of wrist 2. One mechanical link runs from wrist housing 4 through roll drive servo motor 6 and large universal joint 26 to wrist output plate 32. A second mechanical link runs through screw drive servo motor 18 and small universal joint 28, and the third, through screw drive servo motor 20 and small universal joint 30. The three mechanical links are connected to output plate 32 at three separate locations, that is, at holes 52, 128, 130.

The cartesian coordinate system of wrist 2 is defined by X, Y, and Z axes. Rotations about these three axes correspond to roll, yaw, and pitch motions, respectively. The orientation of wrist output plate 32 relative to wrist housing 4 may be characterized by a set of roll $\alpha$, yaw $\beta$, and pitch $\gamma$ angles. The home position of wrist output plate 32 is defined as having roll $\alpha$, yaw $\beta$, and pitch $\gamma$ angles of ninety degrees, ninety degrees, and zero degrees, respectively.

All rotations of wrist output plate 32 relative to wrist housing 4 occur about the center of large universal joint 26. Roll drive servo motor 6 drives large universal joint 26 to rotate about the X (roll) axis, which in turn imparts roll motion to wrist output plate 32. Screw drive servo motors 18, 20 drive screw struts 22, 24, respectively, to translate along the X (roll) axis. When screw drive servo motors 18, 20 are driven in the same direction, the translations of screw struts 22, 24 impart pitch motion to wrist output plate 32. When screw drive servo motors 18, 20 are driven in opposite directions, screw struts 22, 24 translate to impart yaw motion to wrist output plate 32. Thus, by driving the three servo motors 6, 18, 20, wrist output plate 32 may be driven in roll, yaw, and pitch relative to wrist housing 4.

More particularly, wrist housing 4 includes base support flange 34 by which wrist 2 is rigidly attached to the end of the robot arm. Cycloidal reducer 8 is a cam follower device, that linearly reduces the roll motion imparted by roll drive servo motor 6 to large universal joint 26 and thereby to wrist output plate 32. Cycloidal reducer 8 includes reducer input 38, reducer output shaft 40, and reducer housing 36, which is rigidly mounted to wrist housing 4.

Roll drive servo motor 6 is mounted on cycloidal reducer 8. Roll drive servo motor 6 is an electromechanical actuator that includes roll motor housing 42 and roll output shaft 44. Roll motor housing 42 is rigidly mounted to reducer housing 36, and roll output shaft 44 is rigidly attached to reducer input 38. Reducer output shaft 40 is rigidly attached to input end 46 of large universal joint 26. Output end 48 of large universal joint 26 is rigidly attached to one end of steel shaft 50, whose other end is rigidly mounted in hole 52 of wrist output plate 32.

Roll drive servo motor 6 causes rotational motion of wrist output plate 32 about the X (roll) axis. With wrist housing 4 supported by the robot arm, driving roll drive servo motor 6 causes roll output shaft 44 to rotate about the X (roll) axis. This roll motion is then input to cycloidal reducer 8 at reducer input 38. Cycloidal reducer 8, linearly reduces the roll motion of roll output shaft 44; for example, cycloidal reducer 8 may reduce roll motion by a 288:1 reduction ratio. The reduced roll motion is then output at reducer output shaft 40 which drives the input end 46 of large universal joint 26. This reduced roll motion is transferred to wrist output plate 32 through output end 48 of large universal joint 26 and steel shaft 50. The change in roll $\alpha$ angle of wrist output plate 32 follows the reduced roll motion of reducer output shaft 40. Electricity to power roll drive servo motor 6 may be provided by cables (not shown) that may run from the robot arm to wrist 2 through base support flange 34.

The structure of the second mechanical link, which includes screw drive servo motor 18 and small universal joint 28, and the third mechanical link, which includes screw drive servo motor 20 and small universal joint 30, will now be described in detail. Screw drive servo motors 18, 20 are supported on yoke assembly 10. Yoke assembly 10 is mounted to wrist housing 4. Specifically, yoke assembly 10 is rigidly mounted to the bottom of reducer housing 36 of cycloidal reducer 8 through keel 12. Yokes 14, 16 are rotatably mounted to keel 12 to allow yokes 14, 16 to rotate about the Z (pitch) axis with respect to keel 12. Screw drive servo motors 18, 20 are specifically rotatably mounted to yokes 14, 16, respectively, to allow screw drive servo motors 18, 20 to rotate about the Y (yaw) axis with respect to yokes 14, 16, respectively. Thus, yoke assembly 10 provides two-axis rotational connection between screw drive servo motors 18, 20 and wrist housing 4. Each of screw drive servo motors 18, 20 can rotate about the Y (yaw) axis and the Z (pitch) axis with respect to wrist housing 4.

In a preferred embodiment, yoke assembly 10 is a symmetric assembly including nut 54, lock washer 56, tapered pressure plate 58, needle bearing assembly 96 (including outer race 60, needle bearing cage 62, and inner race 64), yoke 14, ball bearing assembly 66, needle bearing assembly 98 (including outer race 68, needle bearing cage 70, and inner race 72), threaded support 74, keel 12, needle bearing assembly 100 (including inner race 76, needle bearing cage 78, and outer race 80), ball bearing assembly 82, yoke 16, needle bearing assembly 102 (including inner race 84, needle bearing cage 86, and outer race 88), tapered pressure plate 90, lock washer 92, and nut 94. Threaded support 74 is disposed within the center holes of each of the other elements of yoke assembly 10, with threaded nuts 54, 94 screwed onto the threaded ends of threaded support 74 to apply a compressive force for holding yoke assembly 10 together. The longitudinal axis of threaded support 74 is parallel to the Z (pitch) axis.

As noted above, yoke assembly 10 includes four needle bearing assemblies 96, 98, 100, 102. Needle bearing assemblies 96, 98 provide the pitch-axis rotation connection between yoke 14 and keel 12. Similarly, needle bearing assemblies 100, 102 provide the pitch-axis rotation connection between yoke 16 and keel 12. Each needle bearing assembly includes a needle bearing cage sandwiched between an inner race and an outer race. For example, needle bearing assembly 96 includes outer race 60, needle bearing cage 62, and inner race 64. The inner and outer diameters of these elements of each needle bearing assembly are similar. For example, the inner diameter of outer race 60 matches the inner diameters of needle bearing case 62 and inner race 64, and the outer diameter of outer race 60 matches the outer diameters of needle bearing case 62 and inner race 64.

Needle bearing cages 62, 70, 78, 86 conventionally include chrome steel needle bearings (not shown) assembled in a plastic housing and lubricated with a lithium-based grease. When assembled, the needle bearings ride on the race surfaces. For example, in needle bearing assembly 96, the needle bearings of needle bearing cage 62 ride on the outer surface of inner race 64 and on the inner surface of outer race 60, where the "inner" surface of an element is defined as that surface facing keel 12.

Ball bearing assemblies 66, 82 provide the pitch-axis rotational connection between threaded support 74 and yokes 14, 16, respectively. The outer diameters of ball bearing assemblies 66, 82 are slightly smaller than the diameters of holes 104, 106 of yokes 14, 16, respectively. Ball bearing assemblies 66, 82 fit within holes 104, 106, respectively. The diameters of holes 104, 106 are smaller than the inner diameters of needle bearing assemblies 96, 98, 100, 102. The inner races of ball bearing assemblies 66, 82 ride on threaded support 74 and the outer races of ball bearing assemblies 66, 82 are pressed into holes 104, 106, respectively.

Screw drive servo motor 18 is an electromechanical actuator that is pivotally mounted to yoke 14 by bolts 108, 110 and bronze bushings 112, 114. Similarly, screw drive servo motor 20 is an electromechanical actuator that is pivotally mounted to yoke 16 by bolts 116, 118 and bronze bushings 120, 122. In a preferred embodiment, screw drive servo motors 18, 20 are three-phase synchronous motors with hollow motor rotors (not shown) and planetary roller nuts (not shown) inside. As described earlier, the mounting of screw drive servo motors 18, 20 in yokes 14, 16, respectively, within yoke assembly 10 permits screw drive servo motors 18, 20 to pivot about both the Y (yaw) axis and the Z (pitch) axis with respect to wrist housing 4. Electricity to power screw drive servo motors 18, 20 may be provided by cables (not shown) that may run from the robot arm to wrist 2 through base support flange 34.

When screw drive servo motor 18 is driven, screw strut 22 is translated along the X axis. Similarly, when screw drive servo motor 20 is driven, screw strut 24 is translated along the X axis. Screw drive servo motors 18, 20 may be driven by the same or different amounts in the same or opposite directions. Screw struts 22, 24 are threaded and they thread through conventional output nuts (not shown) of screw drive servo motors 18, 20, respectively. The input ends of small universal joints 28, 30, each providing two degrees of rotational freedom, are rigidly attached to the ends of screw struts 22, 24, respectively. The output ends of small universal joints 28, 30 are rigidly attached to steel shafts 124, 126, which are also rigidly mounted in holes 128, 130 of wrist output plate 32, respectively.

Holes 52, 128, 130 of wrist output plate 32 are disposed in an isosceles triangle arrangement with the triangle base being the line between holes 128, 130. Screw struts 22, 24 are aligned parallel to each other. When wrist output plate 32 is at the home position where the roll $\alpha$ angle is ninety degrees, screw struts 22, 24 are aligned parallel to the X axis and there is no Y-axis displacement between them. Screw struts 22, 24 operate as a parallel axially loaded structure.

Five points are labeled in FIG. 1. Point A is at the center of small universal joint 28, and point B is at the center of small universal joint 30. Point C is at the center of large universal joint 26. It will be appreciated that all rotations of wrist output plate 32 relative to wrist housing 4 occur about point C. Point A' is where the pitch and yaw axes of screw drive motor 18 in yoke assembly 10 intersect. Point B' is where the pitch and yaw axes of screw drive motor 20 in yoke assembly 10 intersect.

As described above, wrist 2 of the present invention is configured with three mechanical links. These three mechanical links make wrist 2 a closed loop mechanical system. This closed-loop characteristic provides wrist 2 with the advantage of being able to support loads far greater than conventional open-loop wrists of similar size.

The closed-loop nature of wrist 2 also limits the envelope of roll $\alpha$, yaw $\beta$, and pitch $\gamma$ angles through which wrist output plate 32 can rotate with respect to wrist housing 4. In a preferred embodiment, the envelope is plus seventy-seven degrees to plus one-hundred-and-three degrees in roll, plus seventy-seven degrees to plus one-hundred-and-three degrees in yaw, and minus twenty degrees to plus one hundred and ten degrees in pitch. This envelope of wrist 2 is sufficient for application in systems designed to stack and unstack packages in the field of package shipping.

When wrist output plate 32 is at the home position of roll $\alpha$ angle 90 degrees, driving screw drive servo motors 18, 20 in the same direction by the same amount results in pure pitch motion of wrist output plate 32 about the Z (pitch) axis. In general, however, when the roll $\alpha$ angle is not exactly 90 degrees, the closed-loop nature of wrist 2 implies that driving screw drive servo motors 18, 20 will result in motion of wrist output plate 32 that may be coupled between yaw and pitch motions. Similarly, driving roll drive servo motor 6 may result in coupled motion of wrist output plate 32 between roll, yaw, and pitch rotations.

The coupling of roll, yaw, and pitch motions that results from the closed-loop nature of wrist 2 complicates the operational control of wrist 2. If there were no coupling, then driving roll drive servo motor 6 would result in pure roll motion of wrist output plate 32. Similarly, without coupling, pure yaw and pitch motions of wrist output plate 32 could be performed by driving screw drive servo motors 18, 20 in either the same or opposite directions. However, as a result of the coupling, driving roll drive servo motor 6 may result in slight yaw and/or pitch motions of wrist output plate 32 in addition to roll motion. Similarly, driving screw drive servo motors 18, 20 may result in coupling between yaw and pitch motions of wrist output plate 32. Thus, in order to move wrist output plate in only one direction (i.e., either roll, yaw, or pitch), all three servo motors 6, 18, 20 may need to be driven.

Roll drive servo motor 6 and screw drive servo motors 18, 20 are each equipped with an encoder (not shown) that generates displacement signals representative of the changes in angular displacement of the output shaft of the servo motor with respect to the servo motor housing. These three encoder displacement signals may be used to control the orientation of wrist output plate 32. The encoder of roll drive servo motor 6 indicates changes in the angular displacement between roll output shaft 44 and roll motor housing 42. Since the linear reduction ratio of cycloidal reducer 8 of wrist 2 is known (e.g., 288:1) and since there is an approximate 1:1 relationship between the roll motion at reducer output shaft 40 and the roll motion of wrist output plate 32, the roll $\alpha$ angle of wrist output plate 32 may be determined by dividing the change in the angular displacement of roll drive servo motor 6 by 288. The encoder values of screw drive servo motors 18, 20 indicate changes in the angular displacements within servo motors 18, 20, and correspond to changes in the X-axis displacements of screw struts 22, 24, respectively.

OVERVIEW OF THE WRIST CONTROL METHOD

Figure 3:
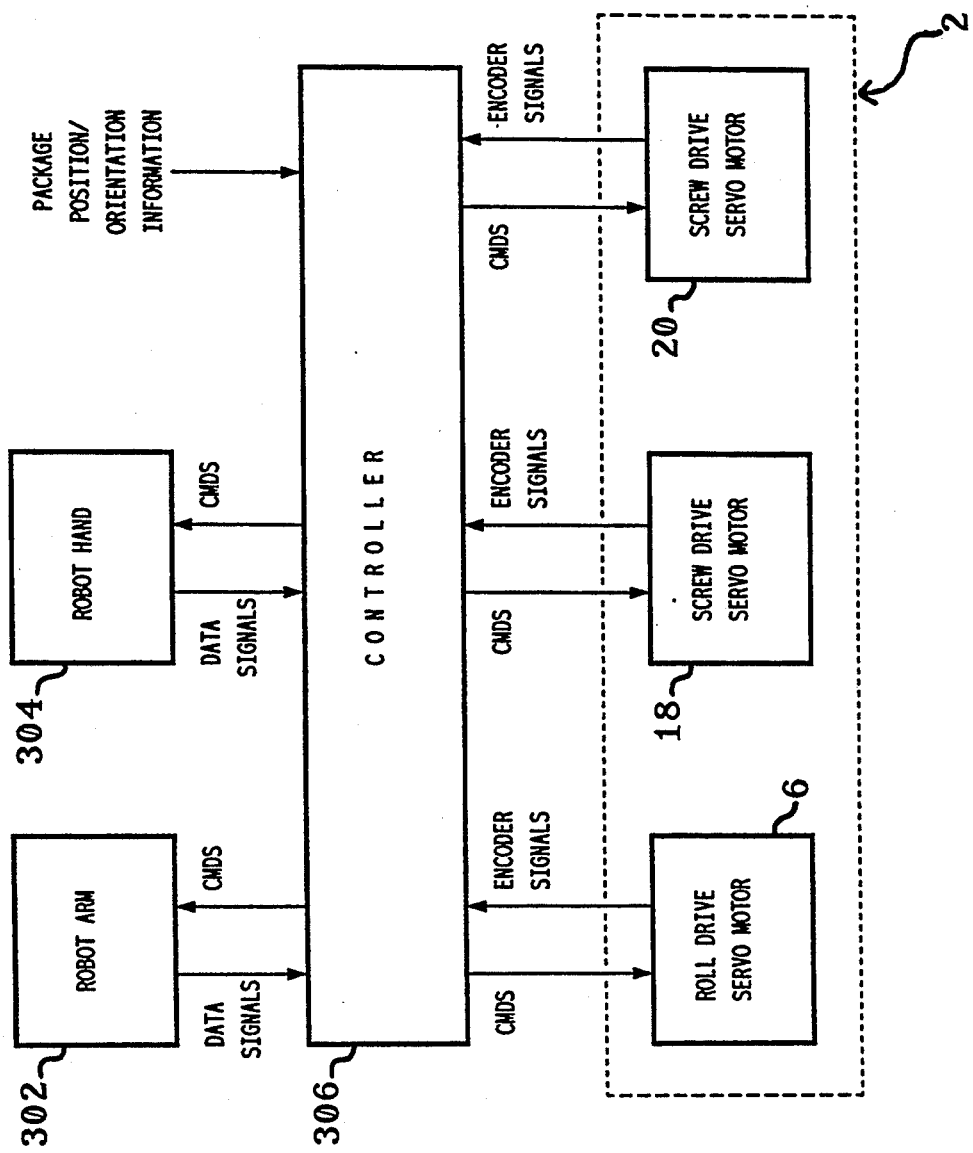
FIG. 3 is a block diagram of the control system for the anthropomorphic robot that includes the wrist of FIG. 1.

Referring now to FIG. 3, there is shown a block diagram of control system 300 for the anthropomorphic robot that includes wrist 2 of the present invention. As described earlier, in a preferred embodiment, wrist 2 forms only part of a larger anthropomorphic robot system that also includes robot arm 302 and robot hand 304. Multiple axes robot controller 306 operates each of these three robot subsystems to control the overall operations of the anthropomorphic robot of stacking and unstacking packages. In a preferred embodiment, controller 306 may be a Motorola MC68020 microprocessor with a CPU clock speed of 16.67 MHz through a VME bus. Based on signals received from the three robot subsystems and information regarding package position and orientation, controller 306 generates commands to drive the actuators of the three robot subsystems to perform the desired functions of the overall robot system. From wrist 2, controller 306 receives position encoder displacement signals from the position encoders of roll drive servo motor 6 and screw drive servo motors 18, 20, and generates commands to drive those three servo motor actuators.

Controller 306 implements an overall control method to coordinate the activities and functions of wrist 2, robot arm 302, and robot hand 304. Part of that overall control method is the wrist control method of the present invention for controlling the operations of wrist 2. This wrist control method solves the problems involved in controlling the operations of wrist 2 with its closed-loop coupling of motion between roll, yaw, and pitch rotations. Conventional methods may be used to control the operations of the conventional robot arms and robot hands that may be included in the overall robot system. These conventional methods will be known to those skilled in the art and are beyond the scope of the present invention.

Wrist 2 may be controlled by controller 306 in one of two modes of operation. The first mode is called the forward kinematic mode, because it implements forward kinematic analysis. In the forward kinematic mode, the angular displacements of the three servo motors 6, 18, 20 of wrist 2 are known and the goal is to determine the orientation (i.e., the set of roll, pitch, and yaw angles) of wrist output plate 32 that corresponds to those three angular displacements. This forward kinematic mode is performed when wrist 2 is initially activated. At that time, the values from the encoders of roll drive servo motor 6 and screw drive servo motors 18, 20 are used to determine the initial orientation of wrist output plate 32. The forward kinematic mode is also performed to determine the orientation of wrist output plate 32 whenever the angular displacements of the servo motors change by known amounts and the new orientation ($\alpha$, $\beta$, $\gamma$) of wrist output plate 32 is to be determined.

In addition, the forward kinematic mode is performed when wrist output plate 32 is driven in cartesian motion. Cartesian motion occurs when wrist output plate 32 is to be driven by the anthropomorphic robot from a known start position and orientation to a desired end position and orientation along a specific path while maintaining specific orientations. For example, cartesian motion occurs when the robot moves a package in a straight line from one position to a second position while maintaining the same orientation of the package. To provide this cartesian motion, wrist 2 is operated in the forward kinematic mode.

The second mode of operation for wrist 2 is called the inverse kinematic mode, because it implements inverse kinematic analysis. The inverse kinematic mode is performed to determine the three servo motor angular displacements when the roll, yaw, and pitch orientation of wrist output plate 32 is given. This inverse kinematic mode is performed when the current orientation and the desired orientation of wrist output plate 32 are both known and the goal is to determine the changes in the angular displacements of the three servo motors 6, 18, 20 required to drive wrist output plate 32 from its current orientation to the desired orientation.

In typical operations of wrist 2, the forward kinematic mode is performed when wrist 2 is initially activated. From then on, control may be implemented through the inverse kinematic mode. Because wrist 2 is a closed-loop system, a simple closed-form solution does not exist for the forward kinematic mode. The forward kinematic mode of the wrist control method of the present invention is derived by modeling wrist 2 as an open-loop system.

DERIVATION OF THE WRIST CONTROL METHOD

Figure 4:
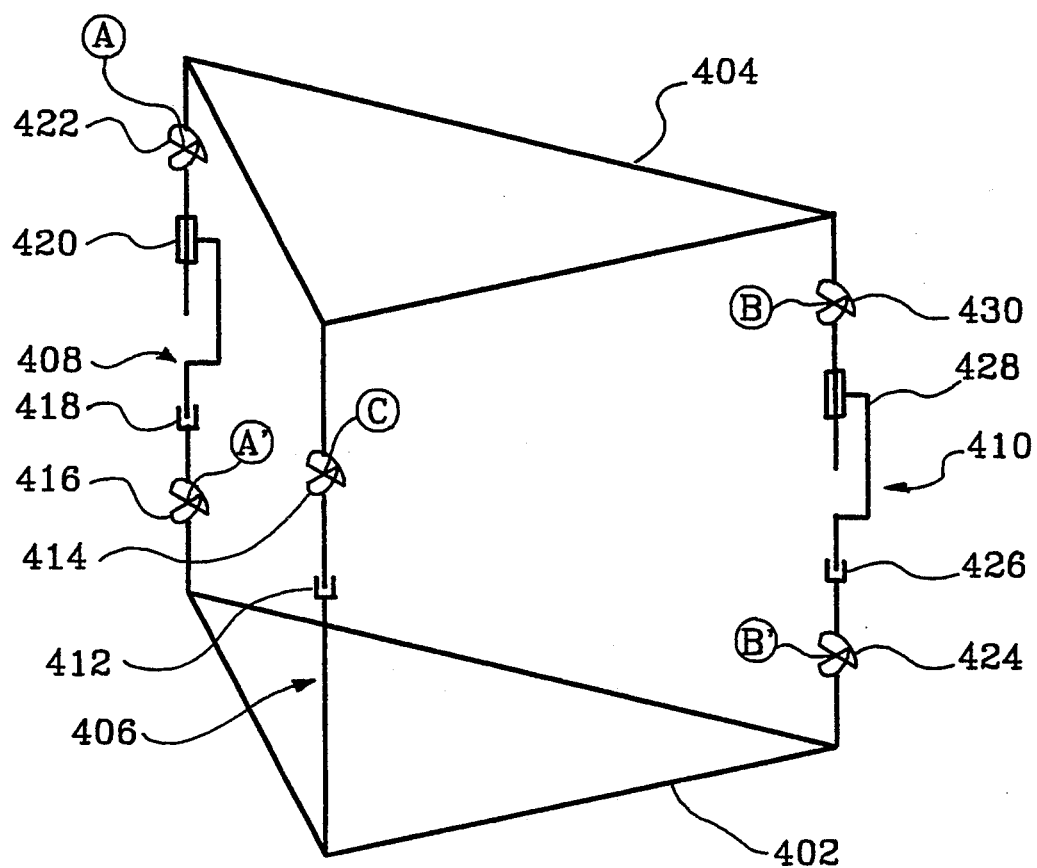
FIG. 4 is a true schematic representation of the wrist of FIG. 1.
Figure 5:
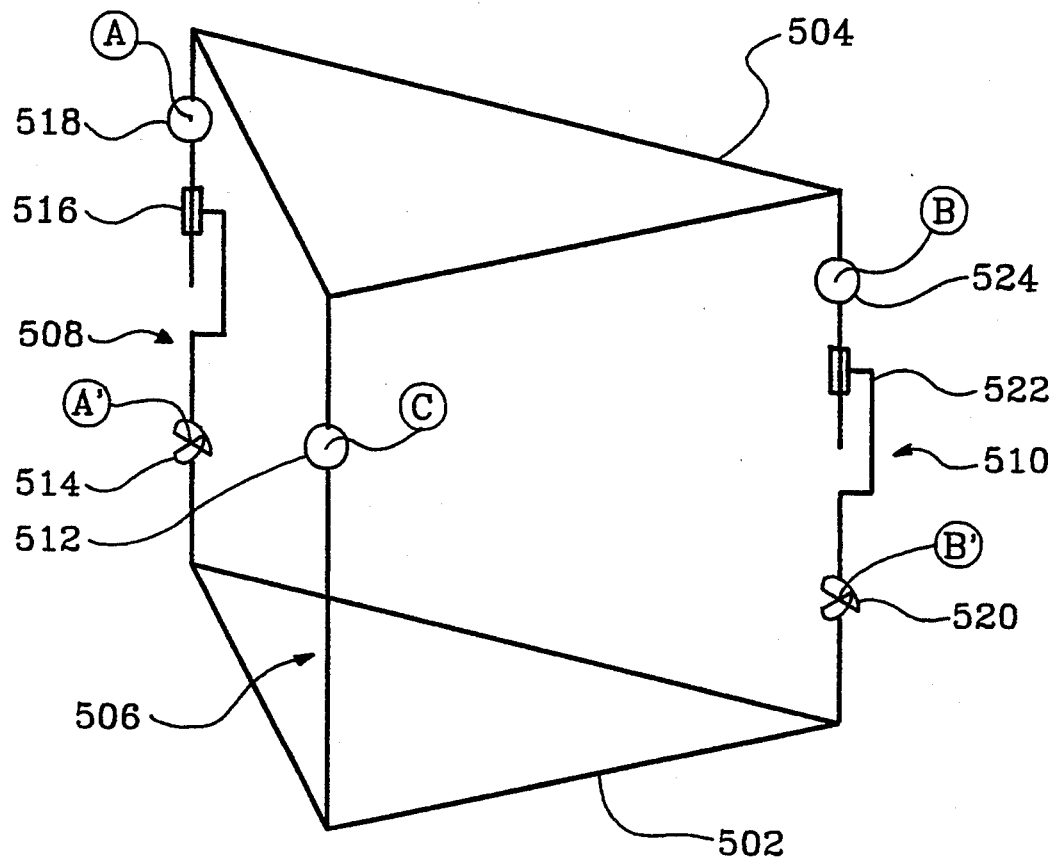
FIG. 5 is a schematic representation of an equivalent mechanical model of the wrist of FIG. 1.
Figure 6:
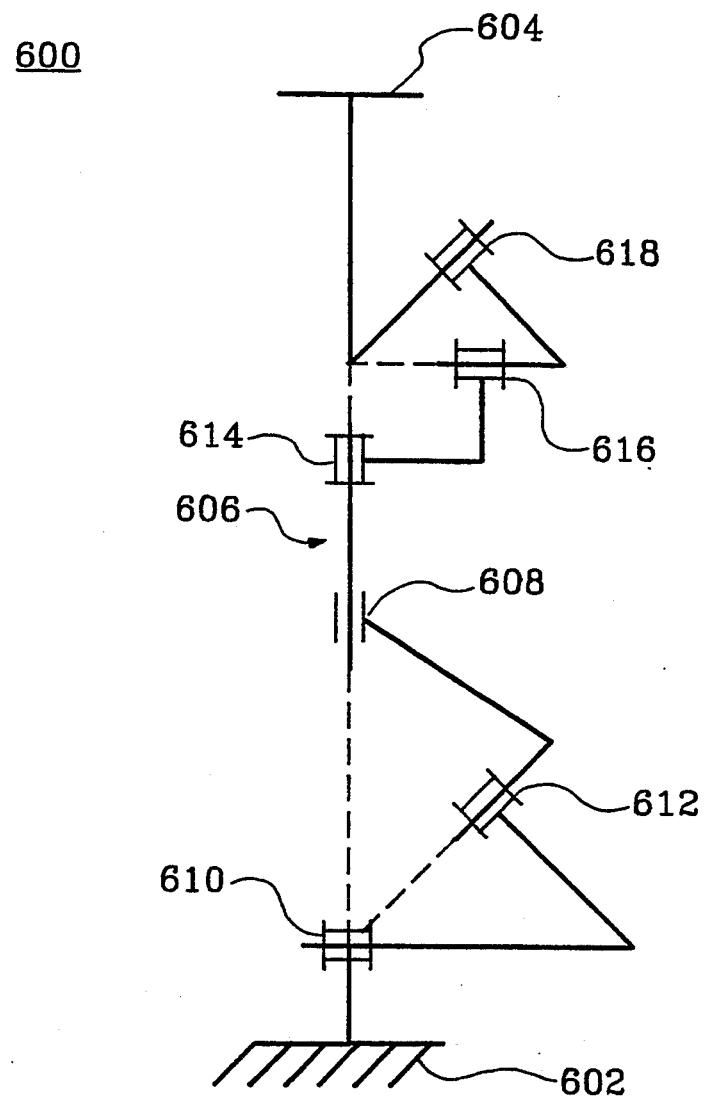
FIG. 6 is a schematic representation of one of the mechanical links of FIG. 5 depicted as an open-loop mechanical model.

Referring now to FIGS. 4, 5, 6, there are shown the schematic representations of wrist 2 that are used to derive the wrist control method of the present invention. Note that this process of deriving the wrist control method is not performed during real-time operations of wrist 2. This derivation process is performed off-line and is used to generate the wrist control method that is implemented in real time to control the real-time operations of wrist 2.

In FIG. 4, there is shown schematic representation 400 of wrist 2. Schematic representation 400 is the true schematic representation of closed-loop wrist 2. The elements of schematic representation 400 correspond to elements and mechanical links of wrist 2 depicted in FIG. 1. Mechanical input 402 of schematic representation 400 corresponds to wrist housing 4 of wrist 2, and mechanical output 404 corresponds to wrist output plate 32. Points A, B, C, A', and B' correspond to points A, B, C, A', and B' of FIG. 1.

Mechanical link 406 corresponds to the mechanical link of wrist 2 from wrist housing 4 through roll drive servo motor 6, cycloidal reducer 8, large universal joint 26, and steel shaft 50 to wrist output plate 32. Mechanical link 406 includes revolute joint 412 and universal joint 414. A revolute joint provides one degree-of-freedom rotational motion (i.e., roll). A universal joint provides two degree-of-freedom rotational motion (i.e., yaw and pitch). Revolute joint 412 corresponds to the combination of roll drive servo motor 6 and cycloidal reducer 8 of wrist 2. Universal joint 414 corresponds to large universal joint 26.

Mechanical link 408 corresponds to the mechanical link of wrist 2 from wrist housing 4 through reducer housing 36 of cycloidal reducer 8, yoke assembly 10, screw drive servo motor 18, screw strut 22, small universal joint 28, and steel shaft 124 to wrist output plate 32. Mechanical link 408 includes universal joint 416, revolute joint 418, helical joint 420, and universal joint 422. A helical joint provides one degree-of-freedom rotational motion (i.e., roll) and translational motion (i.e., along the roll axis) that is in fixed relation to the rotational motion. Universal joint 416 corresponds to yoke assembly 10 of wrist 2. Revolute joint 418 and helical joint 420 together correspond to the combination of screw drive servo motor 18 and screw strut 22. Universal joint 422 corresponds to small universal joint 28.

Mechanical link 410 corresponds to the mechanical link of wrist 2 from wrist housing 4 through reducer housing 36 of cycloidal reducer 8, yoke assembly 10, screw drive servo motor 20, screw strut 24, small universal joint 30, and steel shaft 126 to wrist output plate 32. Mechanical link 410 includes universal joint 424, revolute joint 426, helical joint 428, and universal joint 430. Universal joint 424 corresponds to yoke assembly 10 of wrist 2. Revolute joint 426 and helical joint 428 together correspond to the combination of screw drive servo motor 20 and screw strut 24. Universal joint 430 corresponds to small universal joint 30.

Referring now to FIG. 5, there is shown schematic representation 500, an equivalent mechanical model of wrist 2 of the present invention. The elements of schematic representation 500 correspond to elements and mechanical links of wrist 2 in FIG. 1 and of schematic representation 400 in FIG. 4. Mechanical input 502 of schematic representation 500 corresponds to mechanical input 402 of schematic representation 400, and mechanical output 504 corresponds to mechanical output 404. Mechanical links 506, 508, 510 correspond to mechanical links 406, 408, 410, respectively.

Schematic representation 500 is mechanically equivalent to schematic representation 400. In converting from the schematic representation of FIG. 4 to the schematic representation of FIG. 5, the equivalent of FIG. 4 has been derived by converting all joints to spherical and prismatic joints only, to the extent possible, and representing any remaining freedom of movement as universal or revolute joints, as necessary. This step simplifies the derivation, shown below, of an open-loop approximation of the wrist. Mechanical link 506 includes spherical joint 512 which is mechanically equivalent to the combination of revolute joint 412 and universal joint 414 of schematic representation 400. A spherical joint provides three degree-of-freedom rotational motion (i.e., roll, yaw, and pitch).

Mechanical link 508 includes universal joint 514, prismatic joint 516, and spherical joint 518. A prismatic joint provides one degree-of-freedom translational motion (i.e., along roll axis). Universal joint 514 corresponds to universal joint 416 of schematic representation 400. Prismatic joint 516 corresponds to the translational motion of helical joint 420. Spherical joint 518 corresponds to the combination of revolute joint 418, the rotational motion of helical joint 420, and universal joint 422.

Similarly, mechanical link 510 includes universal joint 520, prismatic joint 522, and spherical joint 524. Universal joint 520 corresponds to universal joint 424 of schematic representation 400. Prismatic joint 522 corresponds to the translational motion of helical joint 428. Spherical joint 524 corresponds to the combination of revolute joint 426, the rotational motion of helical joint 428, and universal joint 430.

Points A, B, C, A', and B' of FIG. 5 correspond to points A, B, C, A', and B' of FIG. 1 and FIG. 4. Vector CA connects point C to point A. Similarly, vectors CB, CA', and CB' connect point C to points B, A', and B', respectively.

Referring now to FIG. 6, there is shown schematic representation 600. Schematic representation 600 is an open-loop mechanical model of specific mechanical links of schematic representation 500 in FIG. 5. Mechanical input 602 of schematic representation 600 corresponds to mechanical input 502 of schematic representation 500, and mechanical output 604 corresponds to mechanical output 504. Mechanical link 606 is an open-loop mechanical model both of mechanical link 508 and of mechanical link 510 of schematic representation 500. Mechanical link 606 includes prismatic joint 608 and five revolute joints 610, 612, 614, 616, 618. Revolute joints 610, 612 together correspond to universal joint 514 of mechanical link 508 and to universal joint 520 of mechanical link 510. Prismatic joint 608 corresponds to prismatic joint 516 of mechanical link 508 and to prismatic joint 522 of mechanical link 510. Revolute joints 614, 616, 618 together correspond to spherical joint 518 of mechanical link 508 and to spherical joint 524 of mechanical link 510.

The forward and inverse kinematic modes of the wrist control method of the present invention are derived by using the equivalent mechanisms of schematic representation 500 and the mechanical links of schematic representation 600. Because mechanical link 506 includes spherical joint 512, wrist 2 may be treated as a typical open-loop wrist with three joints intersecting at a common point C. Such open-loop wrist treatment simplifies the solutions to the forward and inverse kinematic modes. Since the forward kinematic mode involves the implementation of the inverse kinematic mode, the inverse kinematic mode of the wrist control method of the present invention is described first, followed by a description of the forward kinematic mode.

THE INVERSE KINEMATIC MODE OF THE WRIST CONTROL METHOD

Figure 7:
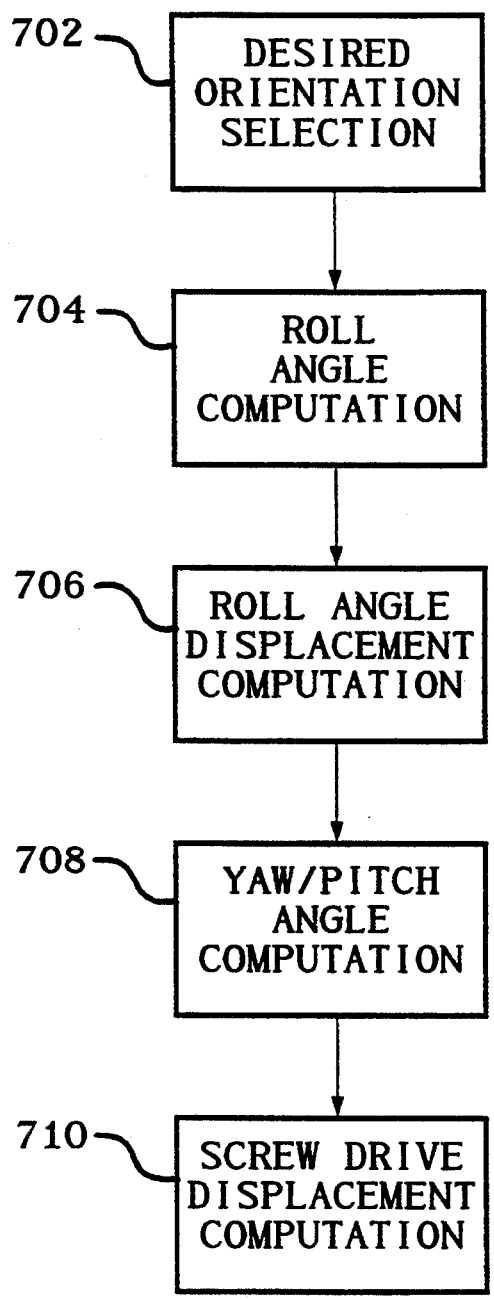
FIG. 7 is a flow chart of the computational steps of the inverse kinematic analysis of the method of the present invention for controlling the wrist of FIG. 1.

Referring now to FIG. 7, there is shown a flow chart of the computational steps of inverse kinematic mode 700 of the wrist control method of the present invention for controlling wrist 2. As described earlier, wrist 2 may be controlled by controller 306 of control system 300 in real time in either of two modes of operation: the forward kinematic mode and the inverse kinematic mode. Inverse kinematic mode 700 determines the angular displacements of the three servo motors 6, 18, 20 of wrist 2 that correspond to a particular orientation ($\alpha$, $\beta$, $\gamma$) of wrist output plate 32. The three servo motors 6, 18, 20 are then driven to achieve the derived servo motor angular displacements to reorient wrist output plate 32 to the particular orientation, using the servo motor encoder displacement signals as feedback signals in the control processing. Inverse kinematic mode 700 is performed both when the robot is driven to pick up a package at a known location and when the robot is driven to deposit a held package to a selected destination.

In desired orientation selection 702 of inverse kinematic mode 700 of the wrist control method, the desired orientation of wrist output plate 32 relative to the reference frame of wrist housing 4 is selected. The desired orientation selection step is not part of the wrist control method of the invention. Rather, the desired orientation is an initial input in the computational steps of the method of the invention. The desired orientation is defined by selected values of roll $\alpha$, yaw $\beta$, and pitch $\gamma$ angles. The goal of inverse kinematic mode 700 is to determine the angular displacements of the three servo motors 6, 18, 20 that correspond to that desired orientation. The desired orientation will place output plate 32 at a desired orientation with respect to a package to be picked up, for example. The desired orientation of wrist output plate 32 is represented by the 3×3 orthonormal rotation matrix $R_e^b$, where:

$$R_e^b = \begin{bmatrix} cac\beta c\gamma - sas\gamma & -cac\beta s\gamma - sac\gamma & cas\beta \\ sac\beta c\gamma + cas\gamma & -sac\beta s\gamma + cac\gamma & sas\beta \\ -s\beta c\gamma & s\beta s\gamma & c\beta \end{bmatrix} = \begin{bmatrix} a_{11} & a_{12} & a_{13} \\ a_{21} & a_{22} & a_{23} \\ a_{31} & a_{32} & a_{33} \end{bmatrix}, \quad (1)$$

where $c\alpha$ is shorthand for $\cos(\alpha)$, and $s\alpha$ is shorthand for $\sin(\alpha)$. In a typical application, the $a_{ij}$ represent the desired orientation of output plate 32 relative to wrist housing 4. The values $a_{ij}$ in Equation (1) are orientation information received by controller 306 and are treated as input to inverse kinematic mode 700.

In roll computation 704 of inverse kinematic mode 700, the roll $\alpha$ angle is determined from Equation (1) by:

$$\alpha = \tan^{-1}\left(\frac{a_{23}}{a_{13}}\right). \quad (2)$$

Since the linear reduction ratio of cycloidal reducer 8 is known (i.e., 288:1), the angular displacement $\theta_{roll}$ of roll drive servo motor 6 that corresponds to the desired orientation of wrist output plate 32 is determined by multiplying the roll $\alpha$ angle by 288 in roll displacement computation 706.

Equation (1) is then used to determine the yaw $\beta$ and pitch $\gamma$ angles in yaw/pitch computation 708, such that:

$$\beta = \cos^{-1}(a_{33}) \quad (3)$$

and $$\gamma = \tan^{-1}\left(\frac{-a_{32}}{a_{31}}\right). \quad (4)$$

Using the roll $\alpha$, yaw $\beta$, and pitch $\gamma$ angles derived in roll computation 704 and yaw/pitch computation 708, the angular displacement $\theta_{ar}^m$ of screw drive servo motor 18 is determined in screw drive computation 710. The derivation of angular displacement $\theta_{ar}^m$ begins with the relationship:

$$\begin{pmatrix} X_a \\ Y_a \\ Z_a \end{pmatrix} = \begin{bmatrix} sac\beta c\gamma - cas\gamma & -sac\beta s\gamma - cac\gamma & sas\beta \\ -cac\beta c\gamma - sas\gamma & cac\beta s\gamma - sac\gamma & -cas\beta \\ s\beta c\gamma & -s\beta s\gamma & -c\beta \end{bmatrix} \begin{pmatrix} X_{eA} \\ Y_{eA} \\ Z_{eA} \end{pmatrix} - \begin{pmatrix} X_{bA'} \\ Y_{bA'} \\ Z_{bA'} \end{pmatrix}, \quad (5)$$

where $c\alpha$ is shorthand for $\cos(\alpha)$, and $s\alpha$ is shorthand for $\sin(\alpha)$. $(X_{eA}, Y_{eA}, Z_{eA})$ are the coordinates of vector CA in FIG. 5 in the reference frame fixed to mechanical output 504 which corresponds to wrist output plate 32. Since points C and A are both fixed points in the reference frame of wrist output plate 32, vector CA is independent of the orientation of wrist output plate 32 relative to wrist housing 4 and coordinates $(X_{eA}, Y_{eA}, Z_{eA})$ are constant. Similarly, $(X_{bA'}, Y_{bA'}, Z_{bA'})$ are the coordinates of vector CA' in FIG. 5 in the reference frame fixed to mechanical input 502 which corresponds to wrist housing 4. Since points C and A' are both fixed points in the reference frame of wrist housing 4, vector CA' is independent of the orientation of wrist output plate 32 and coordinates $(X_{bA'}, Y_{bA'}, Z_{bA'})$ are constants.

The X-axis displacement $l_a$ of screw strut 22 is part of the inverse kinematic solution of mechanical link 408 of schematic representation 400 of wrist 2. The X-axis displacement $l_a$ may be derived by solving the inverse kinematic problem of the equivalent open-loop mechanical model of schematic representation 600. Based on knowledge of the roll $\alpha$, yaw $\beta$, and pitch $\gamma$ angles and using the results of Equation (5), the position and orientation of mechanical output 604 with respect to mechanical input 602 may be used to derive the inverse kinematic solution of mechanical link 408, such that:

$$l_a = Z_a\cos\theta_{a1}\sin\theta_{a2} - Y_a\sin\theta_{a1}\sin\theta_{a2} - X_a\cos\theta_{a2}, \quad (6)$$

where $$\theta_{a2} = \tan^{-1}\left(\frac{Y_a\sin\theta_{a1} - Z_a\cos\theta_{a1}}{X_a}\right), \quad (7)$$

-continued and $$\theta_{a1} = \tan^{-1}\left(\frac{-Y_a}{Z_a}\right). \quad (8)$$

The results of Equations (5), (7), and (8) are then used to calculate the angular displacement $\theta_{as}^m$ of screw strut 22 with respect to screw drive servo motor 18 by:

$$\theta_{as}^m = \quad (9)$$

$$\tan^{-1}\left(\frac{-\cos\theta_{a1}\cos\theta_{a2}c\beta + \sin\theta_{a1}\cos\theta_{a2}cas\beta + \sin\theta_{a2}sas\beta}{-\sin\theta_{a1}c\beta + \cos\theta_{a1}cas\beta}\right).$$

The angular displacement $\theta_{ar}^m$ of screw drive servo motor 18 is then determined from the X-axis displacement $l_a$ and the angular displacement $\theta_{as}^m$ by:

$$\theta_{ar}^m = \frac{l_a}{p_c} - \theta_{as}^m, \quad (10)$$

where $p_c$ is the pitch of the screw threads of screw strut 22 and is not to be confused with the pitch angle $\gamma$.

Similarly, the angular displacement $\theta_{br}^m$ of screw drive servo motor 20 is determined in screw drive computation 710 using relationships similar to those of Equations (5) through (10), such that:

$$\begin{pmatrix} X_b \\ Y_b \\ Z_b \end{pmatrix} = \quad (11)$$

$$\begin{bmatrix} sac\beta c\gamma - cas\gamma & -sac\beta s\gamma - cac\gamma & sas\beta \\ -cac\beta c\gamma - sas\gamma & cac\beta s\gamma - sac\gamma & -cas\beta \\ s\beta c\gamma & -s\beta s\gamma & -c\beta \end{bmatrix} \begin{pmatrix} X_{eB} \\ Y_{eB} \\ Z_{eB} \end{pmatrix} - \begin{pmatrix} X_{bB'} \\ Y_{bB'} \\ Z_{bB'} \end{pmatrix}$$

$(X_{eB}, Y_{eB}, Z_{eB})$ are the coordinates of vector CB in FIG. 5 in the reference frame fixed to mechanical output 504 which corresponds to wrist output plate 32. Since points C and B are both fixed points in the reference frame of wrist output plate 32, vector CB is independent of the orientation of wrist output plate 32 relative to wrist housing 4 and coordinates $(X_{eB}, Y_{eB}, Z_{eB})$ are constant. Similarly, $(X_{bB'}, Y_{bB'}, Z_{bB'})$ are the coordinates of vector CB' in FIG. 5 in the reference frame fixed to mechanical input 502 which corresponds to wrist housing 4. Since points C and B' are both fixed points in the reference frame of wrist housing 4, vector CB' is independent of the orientation of wrist output plate 32 and coordinates $(X_{bB'}, Y_{bB'}, Z_{bB'})$ are constants.

The X-axis displacement $l_b$ of screw strut 24 is part of the inverse kinematic solution of mechanical link 410 of schematic representation 400 of wrist 2. The X-axis displacement $l_b$ may be derived by solving the inverse kinematic problem of the equivalent open-loop mechanical model of schematic representation 600. Based on knowledge of the roll $\alpha$, yaw $\beta$, and pitch $\gamma$ angles and the results of Equation (11), the position and orientation of mechanical output 604 with respect to mechanical input 602 may be used to derive the inverse kinematic solution of mechanical link 410, such that:

$$l_b = Z_b\cos\theta_{b1}\sin\theta_{b2} - Y_b\sin\theta_{b1}\sin\theta_{b2} - X_b\cos\theta_{b2}, \quad (12)$$

where $$\theta_{b2} = \tan^{-1}\left(\frac{Y_b\sin\theta_{b1} - Z_b\cos\theta_{b1}}{X_b}\right), \quad (13)$$

and $$\theta_{b1} = \tan^{-1}\left(\frac{-Y_b}{Z_b}\right). \quad (14)$$

The results of Equations (11), (13), and (14) are then used to calculate the angular displacement $\theta_{bs}^m$ of screw strut 24 with respect to screw drive servo motor 20 by:

$$\theta_{bs}^m = \quad (15)$$

$$\tan^{-1}\left(\frac{-\cos\theta_{b1}\cos\theta_{b2}c\beta + \sin\theta_{b1}\cos\theta_{b2}cas\beta + \sin\theta_{b2}sas\beta}{-\sin\theta_{b1}c\beta + \cos\theta_{b1}cas\beta}\right).$$

The angular displacement $\theta_{br}^m$ of screw drive servo motor 20 is then determined from the X-axis displacement $l_b$ and the angular displacement $\theta_{bs}^m$ by:

$$\theta_{br}^m = \frac{l_b}{p_c} - \theta_{bs}^m. \quad (16)$$

As described, inverse kinematic mode 700 of the wrist control method derives the three servo motor angular displacements $\theta_{roll}$, $\theta_{ar}^m$, $\theta_{br}^m$ that correspond to the desired orientation of wrist output plate 32. These angular displacements may then be used by controller 306 to drive the three servo motors 6, 18, 20 of wrist 2 to achieve the desired orientation using the three servo motor encoder displacement signals as feedback control signals.

THE FORWARD KINEMATIC MODE OF THE WRIST CONTROL METHOD

As described earlier, the forward kinematic mode of the wrist control method is the second of the two modes of controlling the real-time operations of wrist 2. The goal of the forward kinematic mode of the wrist control method is to determine the roll $\alpha$, yaw $\beta$, and pitch $\gamma$ angles that represent the orientation of wrist output plate 32 relative to the reference frame of wrist housing 4. In the forward kinematic mode, the current angular displacements $\theta_{roll}$, $\theta_{ar}^m$, $\theta_{br}^m$ for the three servo motors 6, 18, 20 of wrist 2 are known from displacement signals generated by the three servo motor encoders. The servo motor encoders generate displacement signals representative of changes in the angular displacements of the servo motors. The current angular displacement of a servo motor is determined by summing the encoder displacement signals relative to a known home position.

Figure 8:
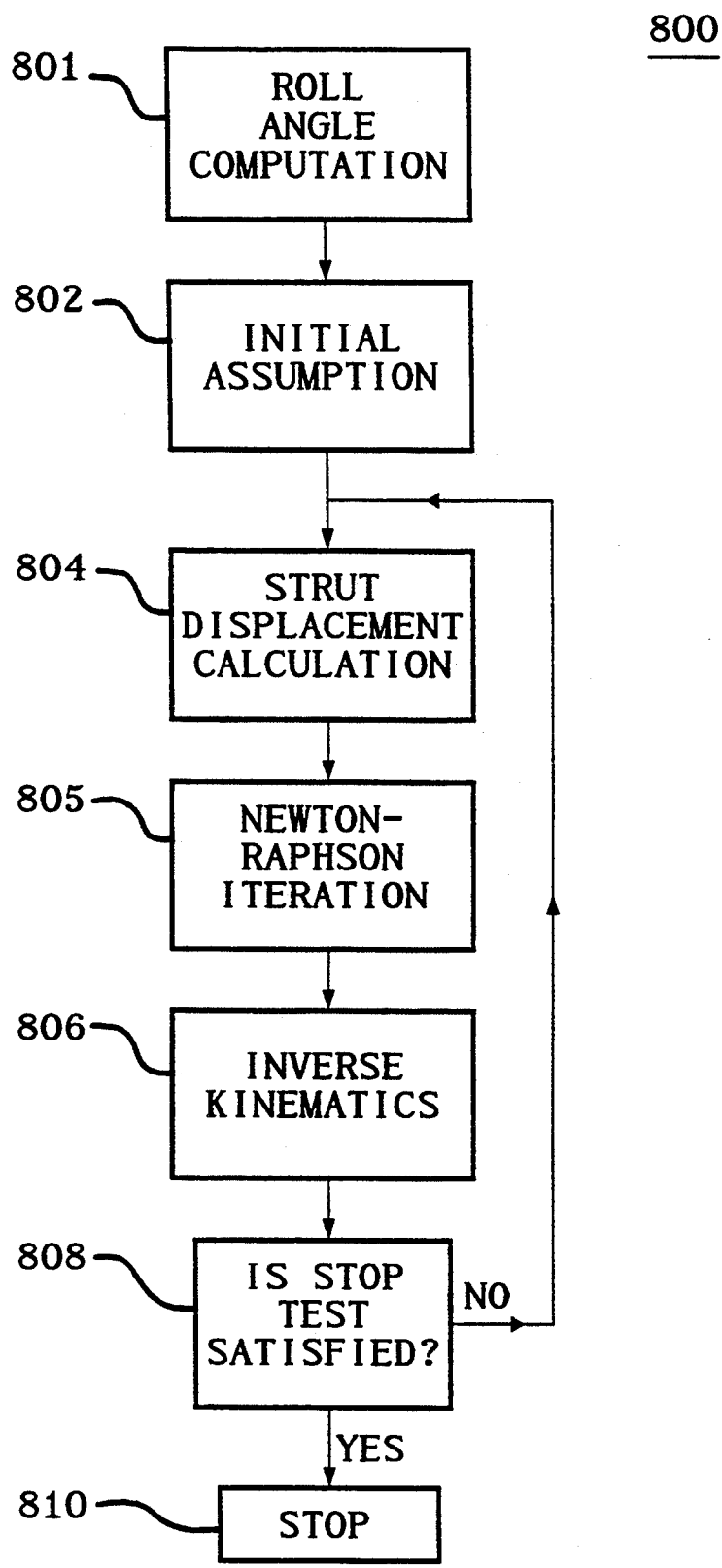
FIG. 8 is a flow chart of the computational steps of the forward kinematic analysis of the method of the present invention for controlling the wrist of FIG. 1.

Referring now to FIG. 8, there is shown a flow chart of the computational steps of forward kinematic mode 800 of the wrist control method of the present invention for controlling wrist 2 used to determine roll $\alpha$, yaw $\beta$, and pitch $\gamma$ angles of wrist output plate 32. Forward kinematic mode 800 is a nested iterative process. The outer iteration successively generates more accurate values for the X-axis displacements $l_a$, $l_b$ of screw struts 22, 24, respectively, that are in turn used to generate successively more accurate values for yaw $\beta$ and pitch $\gamma$ angles. The inner iteration (performed in Newton-Raphson iteration 805) employs Newton-Raphson iteration to generate yaw $\beta$ and pitch $\gamma$ angles using the current estimates of X-axis displacements $l_a$, $l_b$.

Forward kinematic mode 800 begins at roll angle computation 801. As in inverse kinematic mode 700, the roll $\alpha$ angle of wrist output plate 32 may be treated as directly proportional to the angular displacement $\theta_{roll}$ of roll drive servo motor 6. The roll $\alpha$ angle may be determined by dividing the roll drive servo motor angular displacement $\theta_{roll}$ by 288, the reduction ratio of cycloidal reducer 8.

Forward kinematic mode 800 continues with initial assumption 802, wherein the angular displacement $\theta_{as}^m$ of screw strut 22 with respect to screw drive servo motor 18 and the angular displacement $\theta_{bs}^m$ of screw strut 24 with respect to screw drive servo motor 20 are assumed to be zero. Forward kinematic mode 800 continues with strut displacement calculation 804 in which initial values for the X-axis displacements $l_a$, $l_b$ of screw struts 22, 24 are calculated by:

$$l_a = p_c(\theta_{ar}^m + \theta_{as}^m) \tag{17}$$

and $$l_b = p_c(\theta_{br}^m + \theta_{bs}^m), \tag{18}$$

where $p_c$, the screw pitch, is a known constant; the angular displacements $\theta_{ar}^m$, $\theta_{br}^m$ are determined from the encoder displacement signals generated by the encoders of screw drive servo motors 18, 20, respectively; and the angular displacements $\theta_{as}^m$, $\theta_{bs}^m$ are zero, according to initial assumption 802. Forward kinematic mode 800 then continues with Newton-Raphson iteration 805 in which initial values for yaw $\beta$ and pitch $\gamma$ angles are computed using the values of the X-axis displacements $l_a$, $l_b$ computed in strut displacement calculation 804. Newton-Raphson iteration 805 of forward kinematic mode 800 is described in greater detail below.

After generating the initial yaw $\beta$ and pitch $\gamma$ angles by Newton-Raphson iteration 805, forward kinematic mode 800 continues with inverse kinematics 806 in which values for angular displacements $\theta_{as}^m$, $\theta_{bs}^m$ are generated using Equations (9) and (15) to replace the zero values of initial assumption 802.

Stop test 808 is bypassed on the first cycle of the outer iterative loop of forward kinematic mode 800. On the first cycle, forward kinematic mode 800 continues directly from inverse kinematics 806 to return to strut displacement calculation 804 to calculate new values of the X-axis displacements $l_a$, $l_b$ using the new angular displacement values $\theta_{as}^m$, $\theta_{bs}^m$ generated in inverse kinematics 806. Newton-Raphson iteration 805 and inverse kinematics 806 are then repeated using the new values of X-axis displacements $l_a$, $l_b$.

In the second and subsequent cycles of the outer iterative loop, stop test 808 is performed following inverse kinematics 806 to tests the outer iterative loop of forward kinematic mode 800 for convergence. If the difference between the new yaw $\beta$ angle and the previous yaw $\beta$ angle is less than a selected yaw angle stop criterion and if the difference between the new pitch $\gamma$ angle and the previous pitch $\gamma$ angle is less than a selected pitch angle stop criterion, then forward kinematic mode 800 has converged and forward kinematic mode 800 is concluded at stop 810.

Otherwise, forward kinematic mode 800 returns to strut displacement calculation 804 to calculate new values of the X-axis displacements $l_a$, $l_b$ using the new angular displacement values $\theta_{as}^m$, $\theta_{bs}^m$ generated in inverse kinematics 806. Newton-Raphson iteration 805 and inverse kinematics 806 are then repeated using the new values of X-axis displacements $l_a$, $l_b$. Forward kinematic mode 800 continues until stop test 808 is satisfied.

Those skilled in the art will understand that the accuracy with which the wrist control method is required to orient wrist output plate 32 may dictate the values selected for the stop criteria of stop test 808. If the orientation accuracy requirements are relatively loose, initial assumption 802 (i.e., that angular displacements $\theta_{as}^m$, $\theta_{bs}^m$ are zero) may lead to yaw $\beta$ and pitch $\gamma$ angles derived in Newton-Raphson iteration 805 that are sufficiently accurate on the first cycle of the outer iterative loop. In those situations, a second cycle through the outer iterative loop of forward kinematic mode 80 is not required. Furthermore, in those situations, inverse kinematics 806 and stop test 808 need not be performed.

MATHEMATICS OF NEWTON-RAPHSON ITERATION

Newton-Raphson iteration 805 is employed in forward kinematic mode 800 of the wrist control method to generate the yaw $\beta$ and pitch $\gamma$ angles of wrist output plate 32. These angles correspond to the orientation of wrist output plate 32 for the roll $\alpha$ angle of wrist output plate 32 (computed from the angular displacement $\theta_{roll}$ of roll drive servo motor 6) and the current estimates of the X-axis displacements $l_a$, $l_b$ of screw struts 22, 24 (generated in strut displacement calculation 804). The yaw $\beta$ and pitch $\gamma$ angles are related to the roll $\alpha$ angle and the X-axis displacements $l_a$, $l_b$ by:

$$f(x, y) = a_1 x^2 y^2 + a_2 x^2 y + a_3 x y^2 + \\ a_4 x^2 + a_5 y^2 + a_6 x y + a_7 x + a_8 y + a_9 = 0 \tag{19}$$

and $$g(x, y) = b_1 x^2 y^2 + b_2 x^2 y + b_3 x y^2 + \\ b_4 x^2 + b_5 y^2 + b_6 x y + b_7 x + b_8 y + b_9 = 0, \tag{20}$$

where $$x = \tan \frac{\beta}{2} \tag{21}$$

and $$y = \tan \frac{\gamma}{2}. \tag{22}$$

The constants $a_i$, $i=1-9$, in Equation (19) are determined from the relationships:

$$a_1 = 2X_{eA}(Y_{bA'}\cos\alpha - X_{bA'}\sin\alpha) - \\ 2Y_{eA}(Y_{bA'}\sin\alpha + X_{bA'}\cos\alpha) - \\ 2Z_{eA}Z_{bA'} - \\ (l_a^2 - X_{eA}^2 - Y_{eA}^2 - Z_{eA}^2 - X_{bA'}^2 - Y_{bA'}^2 - Z_{bA'}^2), \tag{23}$$

$$a_2 = 4(X_{eA}(Y_{bA'}\sin\alpha + X_{bA'}\cos\alpha) + \\ Y_{eA}(Y_{bA'}\cos\alpha - X_{bA'}\sin\alpha)), \tag{24}$$

$$a_3 = 4(Z_{eA}(Y_{bA'}\cos\alpha - X_{bA'}\sin\alpha) + X_{eA}Z_{bA'}), \tag{25}$$

$$a_4 = 2Y_{eA}(Y_{bA'}\sin\alpha + X_{bA'}\cos\alpha) - \\ 2X_{eA}(Y_{bA'}\cos\alpha - X_{bA'}\sin\alpha) - \\ 2Z_{eA}Z_{bA'} - \\ (l_a^2 - X_{eA}^2 - Y_{eA}^2 - Z_{eA}^2 - X_{bA'}^2 - Y_{bA'}^2 - Z_{bA'}^2), \quad (26)$$

$$a_5 = 2Z_{eA}Z_{bA'} - \\ 2Y_{eA}(Y_{bA'}\sin\alpha + X_{bA'}\cos\alpha) - \\ 2X_{eA}(Y_{bA'}\cos\alpha - X_{bA'}\sin\alpha) - \\ (l_a^2 - X_{eA}^2 - Y_{eA}^2 - Z_{eA}^2 - X_{bA'}^2 - Y_{bA'}^2 - Z_{bA'}^2), \quad (27)$$

$$a_6 = 8Y_{eA}Z_{bA'}, \quad (28)$$

$$a_7 = 4(Z_{eA}(Y_{bA'}\cos\alpha - X_{bA'}\sin\alpha) - X_{eA}Z_{bA'}), \quad (29)$$

$$a_8 = 4(X_{eA}(Y_{bA'}\sin\alpha + X_{bA'}\cos\alpha) - Y_{eA}(Y_{bA'}\cos\alpha - X_{bA'}\sin\alpha)), \quad (30)$$

and $$a_9 = 2Z_{eA}Z_{bA'} + \\ 2Y_{eA}(Y_{bA'}\sin\alpha + X_{bA'}\cos\alpha) + \\ 2X_{eA}(Y_{bA'}\cos\alpha - X_{bA'}\sin\alpha) - \\ (l_a^2 - X_{eA}^2 - Y_{eA}^2 - Z_{eA}^2 - X_{bA'}^2 - Y_{bA'}^2 - Z_{bA'}^2), \quad (31)$$

where $\alpha$ is the roll angle of wrist output plate 32, $(X_{eA}, Y_{eA}, Z_{eA})$ and $(X_{bA'}, Y_{bA'}, Z_{bA'})$ are the coordinates of vectors CA and CA' in FIG. 5 described earlier, and $l_a$ is the X-axis displacement of screw strut 22.

The constants $b_i$, $i=1-9$, in Equation (20) are determined from relationships analogous to those of Equations (23) through (31), where $b_i$ are substituted for $a_i$; $l_b$, the X-axis displacement of screw strut 24, is substituted for $l_a$; the coordinates $(X_{eB}, Y_{eB}, Z_{eB})$ of vector CB of FIG. 5 are substituted for $(X_{eA}, Y_{eA}, Z_{eA})$; and the coordinates $(X_{bB'}, Y_{bB'}, Z_{bB'})$ of vector CB' are substituted for $(X_{bA'}, Y_{bA'}, Z_{bA'})$.

Since there are no closed-form solutions to Equations (19) and (20), a method of mathematical iteration may be used to solve these equations. Forward kinematic mode 800 of the wrist control method employs the mathematics of Newton-Raphson iteration to solve Equations (19) and (20). Newton-Raphson iteration is an iterative process through which Equations (19) and (20) are solved by successively updating estimated solutions. In Newton-Raphson iteration an estimated solution $(x_i, y_i)$ is used to generate corrections $\Delta x$, $\Delta y$, by:

$$\Delta x = \frac{-fg_y + gf_y}{f_x g_y - g_x f_y} \quad (32)$$

and $$\Delta y = \frac{-f_x g + fg_x}{f_x g_y - g_x f_y}, \quad (33)$$

where $f$ is $f(x_i, y_i)$ according to Equation (19), $g$ is $g(x_i, y_i)$ according to Equation (20), and $f_x$, $f_y$, $g_x$, $g_y$ are the partial derivatives of $f(x,y)$ and $g(x,y)$ with respect to $x$ and $y$, where:

$$f_x = f_x(x_i, y_i) = 2a_1 x_i y_i^2 + 2a_2 x_i y_i + a_3 y_i^2 + 2a_4 x_i + a_6 y_i + a_7, \quad (34)$$

$$f_y = f_y(x_i, y_i) = 2a_1 x_i^2 y_i + a_2 x_i^2 + 2a_3 x_i y_i + 2a_5 y_i + a_6 x_i + a_8, \quad (35)$$

$$g_x = g_x(x_i, y_i) = 2b_1 x_i y_i^2 + 2b_2 x_i y_i + b_3 y_i^2 + 2b_4 x_i + b_6 y_i + b_7, \quad (36)$$

and $$g_y = g_y(x_i, y_i) = 2b_1 x_i^2 y_i + b_2 x_i^2 + 2b_3 x_i y_i + 2b_5 y_i + b_6 x_i + b_8, \quad (37)$$

The corrections $\Delta x$, $\Delta y$ are then used to update the estimated solution, such that:

$$x_{i+1} = x_i + \Delta x \quad (38)$$

and $$y_{i+1} = y_i + \Delta y. \quad (39)$$

Newton-Raphson iteration continues until $f(x,y)$ and $g(x,y)$ in Equations (19) and (20) are sufficiently close to zero as determined by specified stop criteria. When that condition is met, the most recent estimated solution $(x_{i+1}, y_{i+1})$ may be used as the solution to Equations (19) and (20).

In real-time processing, Newton-Raphson iteration 805 of forward kinematic mode 800 of the wrist control method selects the initial estimated solution $(x_i, y_i)$ from look-up table T. Look-up table T is generated off-line by deriving solutions $(x,y)$ to Equations (19) and (20) that correspond to selected values of roll $\alpha$ angle of wrist output plate 32 and X-axis displacements $l_a$, $l_b$ of screw struts 22, 24.

GENERATION OF LOOK-UP TABLE T

In theory, wrist output plate 32 may assume any roll $\alpha$ angle between 0 degrees and 360 degrees. Similarly, in theory, X-axis displacements $l_a$, $l_b$ of wrist 2 may each assume any value between 0 inches and 11 inches. However, the closed-loop mechanical characteristics of wrist 2 limit the ranges of roll angles and X-axis displacements. Roll $\alpha$ angle is limited in wrist 2 to the range from 77 degrees to 103 degrees. Furthermore, the X-axis displacements $l_a$, $l_b$ in wrist 2 must be within two inches of each other. Thus, if $l_a$ is 3.4 inches, then $l_b$ may only assume values from 1.4 inches to 5.4 inches, and vice versa. Look-up table T contains solutions $(x,y)$ to Equations (19) and (20) that correspond to values of roll $\alpha$ angle and X-axis displacements $l_a$, $l_b$ that satisfy those limits and conditions.

The forward kinematic parameters (i.e., roll $\alpha$ angle and X-axis displacements $l_a$, $l_b$) may be depicted as defining the three axes of a three-dimensional cartesian coordinate system. In this forward kinematic space, the roll $\alpha$ angle axis runs from 0 degrees to 360 degrees, and the two X-axis displacement axes $l_a$, $l_b$ run from 0 inches to 11 inches. Each point in this space, corresponds to a unique set of $(\alpha, l_a, l_b)$ values. As described above, wrist 2 is a closed-loop mechanical system that is limited to roll $\alpha$ angles from 77 degrees to 103 degrees. It is also limited in that the X-axis displacements $l_a$, $l_b$ must be within two inches of each other. Thus, the set of possible $(\alpha, l_a, l_b)$ values for wrist 2 defines a volume in the forward kinematic space. Each point $(\alpha, l_a, l_b)$ in this volume corresponds to a particular orientation of wrist output plate 32 relative to wrist housing 4. Each orientation of wrist output plate 32 is represented by a unique set of roll $\alpha$, yaw $\beta$, and pitch $\gamma$ angles.

Look-up table T contains table data corresponding to the output plate orientation ($\alpha$, $\beta$, $\gamma$) associated with selected points ($\alpha$, $l_a$, $l_b$) in forward kinematic space. The set of points ($\alpha$, $l_a$, $l_b$) in look-up table T are selected for roll $\alpha$ angles in two-degree increments from 77 degrees to 103 degrees, and for X-axis displacements $l_a$, $l_b$ from 0 inches to 11 inches in 0.5-inch increments. The table data stored in look-up table T are the solutions (x,y) to Equations (19) and (20) for the selected ($\alpha$, $l_a$, $l_b$) points.

The selection of a two-degree increment for the roll $\alpha$ angle range from implies that look-up table T contains table data for 14 different values of roll $\alpha$ angle. These angles may be represented by the row index h, where (h=0) corresponds to roll $\alpha$ angle 77 degrees, (h=1) corresponds to roll $\alpha$ angle 79 degrees, etc.

Figure 9:
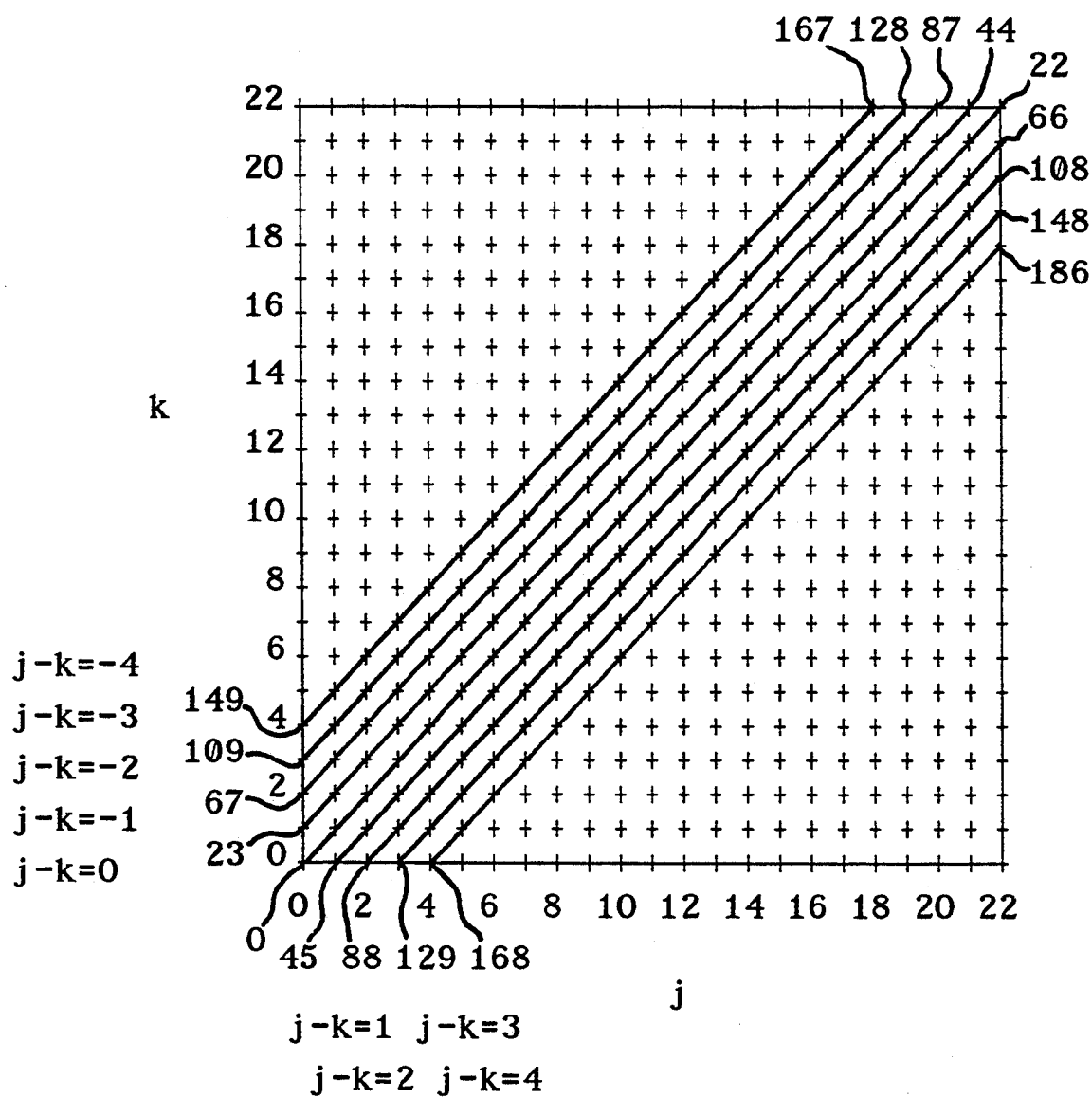
FIG. 9 is a graphical representation of the possible combinations of the X-axis displacements of the screw struts of the wrist of FIG. 1.

Referring now to FIG. 9, there is shown a graphical representation of the possible combinations of the X-axis displacements $l_a$, $l_b$ of screw struts 22, 24 of wrist 2 for a particular roll $\alpha$ angle of wrist output plate 32. The index j runs from 0 to 22 and represents the X-axis displacement $l_a$ of screw strut 22 from 0 inches to 11 inches in 0.5-inch increments. Similarly, the index k runs from 0 to 22 and represents the X-axis displacement $l_b$ of screw strut 24 from 0 inches to 11 inches in 0.5-inch increments. The indices (j,k) may be derived from X-axis displacements $l_a$, $l_b$ by:

$$j = \text{trunc}(2l_a + 0.5) \quad (40)$$

and $$k = \text{trunc}(2l_b + 0.5), \quad (41)$$

where "trunc" is the truncation function. For example, if $l_a$ is 0.7 inches, then $$j = \text{trunc}(2(0.7) + 0.5) = \text{trunc}(1.9) = 1 \quad (42)$$

and if $l_b$ is 2.22 inches, then $$k = \text{trunc}(2(2.22) + 0.5) = \text{trunc}(4.94) = 4. \quad (43)$$

In theory, with an 11-inch range divided into 0.5-inch increments, there are 23×23 or 529 combinations of X-axis displacements $l_a$, $l_b$ for each value of roll $\alpha$ angle. These 529 theoretical combinations are represented by the full area of the square defined by the axes j, k in FIG. 9. However, the condition that the X-axis displacements $l_a$, $l_b$ be within two inches of each other (resulting from the closed-loop mechanical characteristics of wrist 2) eliminates all but 187 of these 529 theoretical combinations. For example, the combination ($l_a$=2.5 inches, $l_b$=5.0 inches), represented by the point (j,k)=(5,10) in FIG. 9, violates the 2-inch difference condition and is therefore eliminated.

The remaining 187 combinations of X-axis displacements $l_a$, $l_b$ lie along and around the diagonal in FIG. 9 that corresponds to those combinations in which the X-axis displacements $l_a$, $l_b$ are identical. The two-dimensional indices (j,k) identifying these 187 combinations may be replaced by the one-dimensional column index i according to the following rules:

$$
\begin{aligned}
(j - k = 0) &\rightarrow (i = j) \\
(j - k = -1) &\rightarrow (i = j + 23) \\
(j - k = 1) &\rightarrow (i = j + 44) \\
(j - k = -2) &\rightarrow (i = j + 67) \\
(j - k = 2) &\rightarrow (i = j + 86) \\
(j - k = -3) &\rightarrow (i = j + 109) \\
(j - k = 3) &\rightarrow (i = j + 126) \\
(j - k = -4) &\rightarrow (i = j + 149) \\
(j - k = 4) &\rightarrow (i = j + 164)
\end{aligned}
\quad (44)
$$

For example, assume that $l_a$=0.7 inches and $l_b$=2.22 inches. From Equations (42) and (43) and rules (44), (j=1), (k=4), (j−k=−3), and (i=j+109=110). This column index i corresponds to the column of look-up table T in which solution (x,y) is stored. Look-up table T is constructed by filling a (14×187) matrix with solutions (x,y) that correspond to the combinations of roll $\alpha$ angle (represented by row index h=0-13) and X-axis displacements $l_a$, $l_b$ (represented by column index i=0-186).

Figure 10:
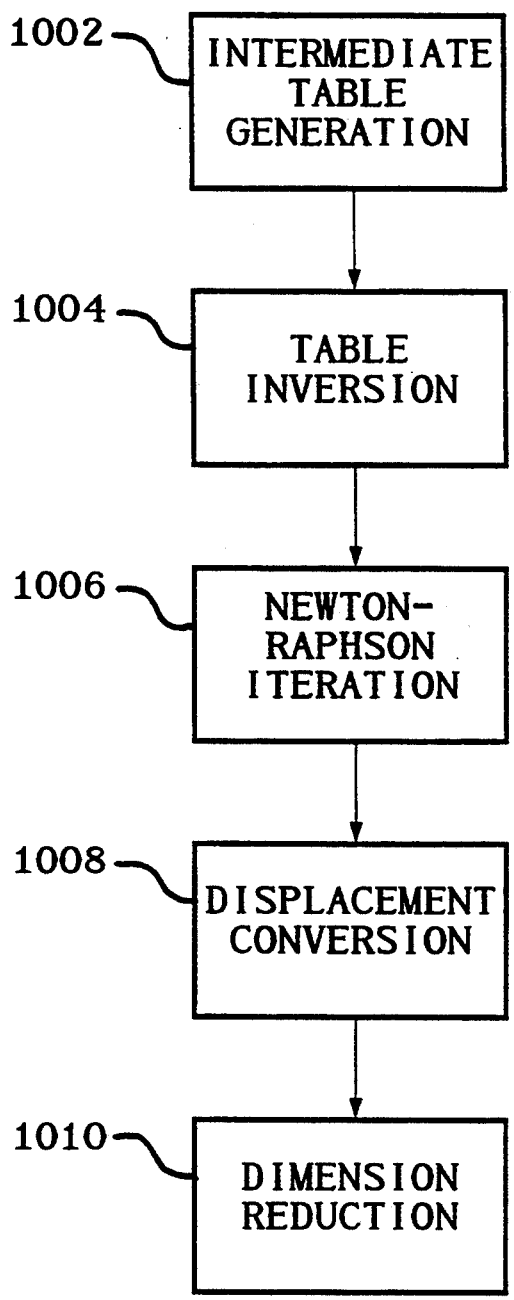
FIG. 10 is a flow chart of the computational steps of the method for generating the look-up table used in the forward kinematic analysis of the method of the present invention for controlling the wrist of FIG. 1.

Referring now to FIG. 10, there is shown a flow chart of the computational steps of method 1000 for generating look-up table T used in forward kinematic mode 800 of the wrist control method of the present invention for controlling wrist 2. Method 1000 is performed off line. Look-up table T contains dependent variables that correspond to independent parameters. The dependent variables are the solutions (x,y) that represent yaw $\beta$ and pitch $\gamma$ angles. The independent parameters are the indices (h,i), where index h represents roll $\alpha$ angle and index i represents X-axis displacements $l_a$, $l_b$. This represents the forward kinematic situation, where the roll $\alpha$ angle and the X-axis displacements $l_a$, $l_b$ are known and the yaw $\beta$ and pitch $\gamma$ angles are determined. As described earlier, no closed-form solution exists for the forward kinematic situation. However, since a closed-form solution does exist for the inverse kinematic situation, the process of generating look-up table T using method 1000 starts with the generation of an intermediate table that has the roles of dependent variables and independent parameters reversed. The intermediate table is generated using inverse kinematic analysis. In the intermediate table, the dependent variables are the X-axis displacements $l_a$, $l_b$ and the independent variables are the roll $\alpha$, yaw $\beta$, and pitch $\gamma$ angles. Look-up table T is then generated in method 1000 through a process that includes inverting the intermediate table.

In a preferred embodiment, method 1000 for generating look-up table T begins with intermediate table generation 1002. In intermediate table generation 1002, intermediate X-axis displacements $l_{ai}$, $l_{bi}$ are generated and stored in intermediate look-up table I by solving inverse kinematic Equations (6) and (12) for every possible combination of orientation values ($\alpha$, $\beta$, $\gamma$) of wrist 2 in one-degree increments for yaw $\beta$ and pitch $\gamma$ angles and in two-degree increments for roll $\alpha$ angles.

After generating intermediate look-up table I in intermediate table generation 1002, method 1000 continues with table inversion 1004. In table inversion 1004, intermediate look-up table I is inverted to form estimated look-up table E. Estimated look-up table E has grid points corresponding to each combination of ($\alpha$, $l_a$, $l_b$) for roll $\alpha$ angles from 77 degrees to 103 degrees in two-degree increments and X-axis displacements $l_a$, $l_b$ from 0 inches to 11 inches in 0.5-inch increments. For each ($\alpha$, $l_a$, $l_b$) combination, intermediate look-up table I is searched for the intermediate X-axis displacements $l_{ai}$, $l_{bi}$ that are closest to each X-axis displacement ($l_a$, $l_b$) grid point of estimated look-up table E for the same roll $\alpha$ angle. The yaw $\beta$ and pitch $\gamma$ angles from intermediate look-up table I corresponding to the closest intermediate X-axis displacements $l_{ai}$, $l_{bi}$ are then stored in estimated look-up table E. In estimated look-up table E, the yaw $\beta$ and pitch $\gamma$ angles are represented by the estimated solution ($x_e$, $y_e$), according to the relationships of Equations (21) and (22).

After generating estimated look-up table E in table inversion 1004, method 1000 continues with Newton-Raphson iteration 1006. In Newton-Raphson iteration 1006, an "exact" solution (x,y) for each estimated solution ($x_e$, $y_e$) of estimated look-up table E is derived employing the Newton-Raphson iteration method of Equations (32) through (39) with the estimated solutions ($x_e$, $y_e$) used as the initial estimated solution ($x_i$,$y_i$) to Equations (19) and (20).

Following Newton-Raphson iteration 1006, method 1000 continues with displacement conversion 1008 in which the X-axis displacement values $l_a$, $l_b$ in look-up table T are replaced by the corresponding intermediate indices (j, k) according to Equations (40) and (41). After displacement conversion 1008, method 1000 continues with dimension reduction 1010. In dimension reduction 1010, the intermediate indices j, k are converted to the column index i of look-up table T according to Rules (44).

Those skilled in the art will recognize that the roll angle increment of two degrees and the X-axis displacement increments of 0.5 inches are selected to insure that Newton-Raphson iteration 805 of forward kinematic mode 800 of the wrist control method will converge for any possible orientation of wrist 2. These values are selected empirically and may be verified by implementing forward kinematic mode 800 while stepping through the full range of possible orientations using arbitrarily small verification increments. It will also be understood by those skilled in the art that alternative embodiments of the wrist of the present invention may have angle and displacement limits and conditions that differ from those of wrist 2.

NEWTON-RAPHSON ITERATION PROCESSING

Figure 11:
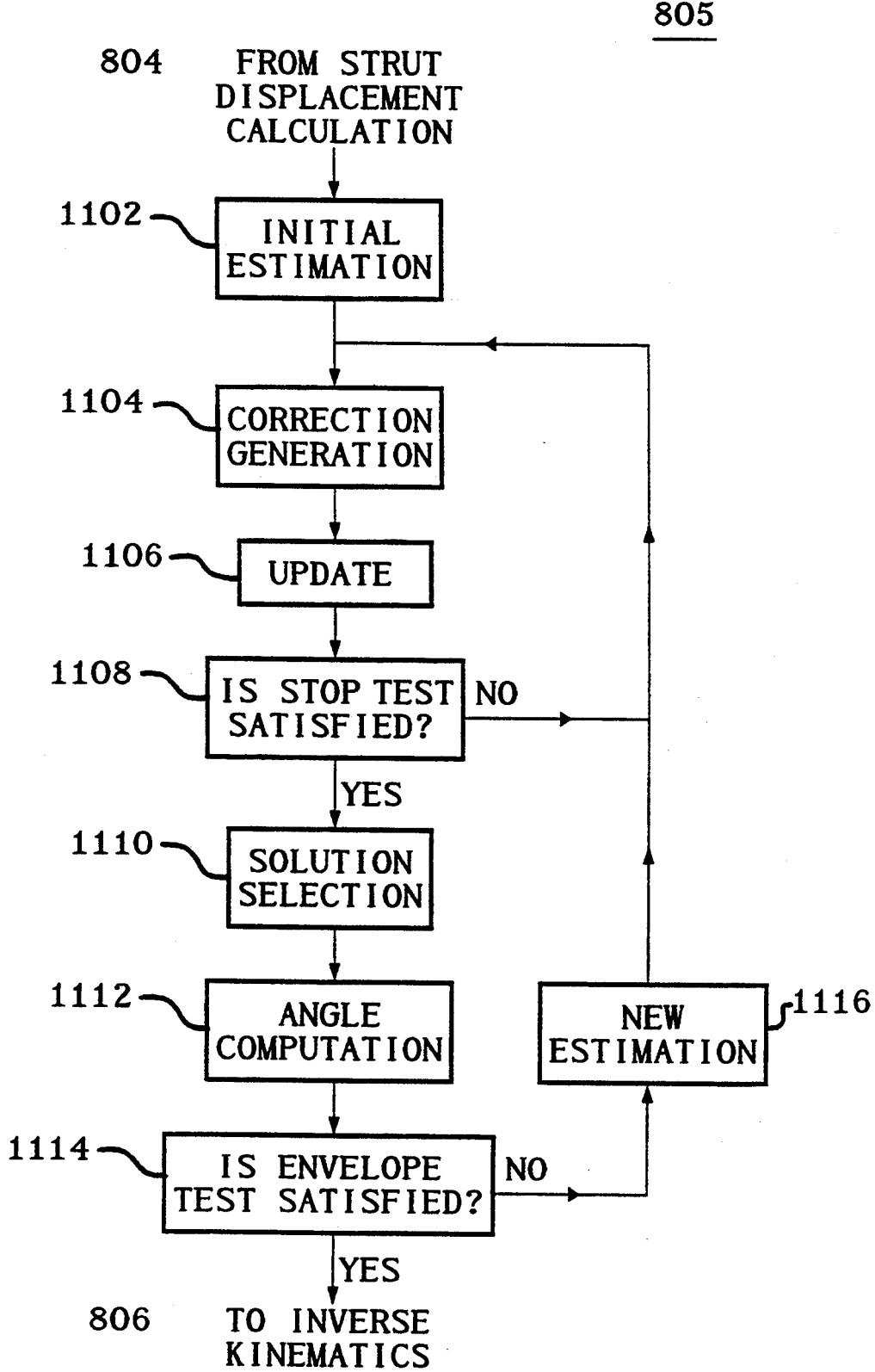
FIG. 11 is a flow chart of the computational steps of the Newton-Raphson iteration procedure employed in the forward kinematic analysis of the method of the present invention for controlling the wrist of FIG. 1.

Referring now to FIG. 11, there is shown a flow chart of the computational steps of Newton-Raphson iteration 805 employed in real time in forward kinematic mode 800 of the wrist control method. Newton-Raphson iteration 805 generates the yaw $\beta$ and pitch $\gamma$ angles of wrist output plate 32 that correspond to the roll $\alpha$ angle of wrist output plate 32 and the current estimates of the X-axis displacements $l_a$, $l_b$ of screw struts 22, 24 generated in strut displacement calculation 804 of forward kinematic mode 800. Newton-Raphson iteration 805 begins with initial estimation 1102 in which an initial estimated solution ($x_i$,$y_i$) to Equations (19) and (20) is selected from look-up table T.

The first step in initial estimation 1102 is to determine the appropriate row index h of look-up table T by rounding the roll $\alpha$ angle of wrist output plate 32 to the nearest roll angle represented in look-up table T. For example, when roll $\alpha$ angle is 79.8 degrees, 79 degrees is the closest roll angle represented and row index h equals 1. When roll $\alpha$ angle is 80.0 degrees, 81 degrees is chosen as the closest represented roll angle and row index h equals 2.

After row index h is determined, the appropriate column index i of look-up table T is derived from the X-axis displacements $l_a$, $l_b$ using Equations (40) and (41) and Rules (44). For example, assume that roll $\alpha$ angle=79.8 degrees, $l_a$=0.7 inches, and $l_b$=2.22 inches. The closest roll $\alpha$ angle represented in look-up table T is 79 degrees which corresponds to row index (h=1) of look-up table T. From Equations (40) and (41) and Rules (44), (j=1), (k=4), (j−k=−3), and (i=j+109=110). Thus, in this example, initial estimation 1102 selects the initial estimated solution ($x_i$,$y_i$) to be the solution (x,y) stored in look-up table T at row 1, column 110.

The initial estimated solution ($x_i$,$y_i$) is then used in correction generation 1104 to generate the corrections $\Delta x$, $\Delta y$, using Equations (32) and (33). The corrections $\Delta x$, $\Delta y$ generated in correction generation 1104 are then used in update 1106 of Newton-Raphson iteration 805 to update the estimated solution ($x_{i+1}$,$y_{i+1}$), using Equations (38) and (39).

In stop test 1108 of Newton-Raphson iteration 805, the accuracy of the new estimated solution ($x_{i+1}$,$y_{i+1}$) is tested against selected stop criteria. If the magnitude of f($x_{i+1}$,$y_{i+1}$) using Equation (19) and the magnitude of g($x_{i+1}$,$y_{i+1}$) using Equation (20) are both less than or equal to the selected stop criteria, then Newton-Raphson iteration 805 is determined to have converged and the new estimated solution ($x_{i+1}$,$y_{i+1}$) is selected as the solution to Equations (19) and (20) in solution selection 1110 of Newton-Raphson iteration 805. Otherwise, Newton-Raphson iteration 805 returns to correction generation 1104 substituting the new estimated solution ($x_{i+1}$,$y_{i+1}$) for ($x_i$,$y_i$) in Equations (32) and (33). Newton-Raphson iteration 805 continues until stop test 1108 detects convergence. Those skilled in the art will understand that the accuracy with which the wrist control method is required to orient wrist output plate 32 may dictate the values selected for the stop criteria of stop test 1108.

After the condition of stop test 1108 is satisfied indicating that Newton-Raphson iteration 805 has converged to solution ($x_{i+1}$,$y_{i+1}$), the corresponding yaw $\beta$ and pitch $\gamma$ angles are computed in angle computation 1112 according to the relationships of Equations (21) and (22), such that:

$$\beta = 2\tan^{-1}(x_{i+1}) \tag{45}$$

and $$\gamma = 2\tan^{-1}(y_{i+1}). \tag{46}$$

After the yaw $\beta$ and pitch $\gamma$ angles are computed in angle computation 1112, they are tested in envelope test 1114 to determine whether the selected solution ($x_{i+1}$,$y_{i+1}$) corresponds to an orientation within the possible envelope of wrist 2. As described above, wrist 2 may achieve orientations within the envelope defined by roll $\alpha$ angles from +77 degrees to +103 degrees, yaw $\beta$ angles from +77 degrees to +103 degress, and pitch $\gamma$ angles from −20 degrees to +110 degrees. Since Equations (19) and (20) are quadratic equations, they have two solutions. One solution will be inside the envelope of wrist 2 and the other will be outside that envelope. Newton-Raphson iteration 805 converges to either the solution inside the envelope or the solution outside the envelope. Both solutions are mathematically correct, but the one outside the envelope is physically impossible and must therefore be rejected.

Envelope test 1114 of Newton-Raphson iteration 805 tests the yaw $\beta$ and pitch $\gamma$ angles computed in angle computation 1112 against specified yaw and pitch angle limits to determine whether the selected solution $(x_{i+1}, y_{i+1})$ is within the permissible envelope. If the yaw $\beta$ and pitch $\gamma$ angles are within the envelope, then Newton-Raphson iteration 805 of forward kinematic mode 800 is complete and processing continues with inverse kinematics 806 of forward kinematic mode 800, as described above.

On the other hand, if either the yaw $\beta$ angle or the pitch $\gamma$ angle is outside the envelope, then Newton-Raphson iteration 805 has converged to the physically impossible solution. In this case, new estimation 1116 of Newton-Raphson iteration 805 selects a new estimated solution $(x_i, y_i)$ from look-up table T. The estimated solution $(x_i, y_i)$ that was originally selected in initial estimation 1102 corresponds to the closest point in look-up table T to the X-axis displacements $l_a$, $l_b$. The grid point in look-up table T corresponds to a corner of a square in FIG. 9 that contains the point $(l_a, l_b)$.

When Newton-Raphson iteration 805 converges to the wrong solution, new estimation 1116 selects from look-up table T as the new estimated solution $(x_i, y_i)$ the solution $(x,y)$ corresponding to another corner of the square in FIG. 9 that contains the point $(l_a, l_b)$. Newton-Raphson iteration 805 continues selecting corners of that square until the iteration converges to the physically permissible solution within the envelope of wrist 2. Look-up table T is generated with sufficient fineness (i.e., generated by method 1000 using sufficiently small roll angle and X-axis displacement increments) to insure that at least one of the corners will lead to convergence within the envelope.

SUMMARY OF THE WRIST CONTROL METHOD

As described above, controller 306 may control in real time the operations of wrist 2 in either the forward kinematic mode or the inverse kinematic mode. In the forward kinematic mode, the roll $\alpha$, yaw $\beta$, and pitch $\gamma$ angles of the orientation of wrist output plate 32 relative to wrist housing 4 are determined from the angular displacements of the three servo motors 6, 18, 20. The roll $\alpha$ angle is determined directly from the angular displacement of roll drive servo motor 6. The yaw $\beta$ and pitch $\gamma$ angles are determined by computations involving nested iterations in which each iteration is based on initial estimations.

The first set of estimations is for the outer iteration and is the assumption that the angular displacements $\theta_{as}^m$, $\theta_{bs}^m$ of screw struts 22, 24 with respect to screw drive servo motors 18, 20 are both zero. This assumption is then used to compute estimations for the X-axis displacements $l_a$, $l_b$ of screw drive servo motors 18, 20, which are in turn used to make the second set of estimations.

For the second set of estimations, that is, the estimations for the inner iteration, the X-axis displacements $l_a$, $l_b$ are used in conjunction with the roll $\alpha$ angle to select from look-up table T estimated values for the yaw $\beta$ and pitch $\gamma$ angles. Newton-Raphson iteration is then performed to derive exact values for the yaw $\beta$ and pitch $\gamma$ angles from these estimated values. These exact values for the yaw $\beta$ and pitch $\gamma$ angles are in turn used to update the estimations for the angular displacements $\theta_{as}^m$, $\theta_{bs}^m$ used in the outer iteration. These updated estimations are then used to repeat the inner iteration. These nested iterations are repeated until the forward kinematic mode computations converge to within a specified accuracy of the true orientation of wrist output plate 32. Once the orientation of wrist output plate 32 is determined, wrist 2 may be controlled in the inverse kinematic mode.

The inverse kinematic mode of operation of wrist 2 determines the angular displacements of the three servo motors 6, 18, 20 that correspond to known orientations of wrist output plate 32 relative to wrist housing 4. Closed-form equations have been described for these determinations. For example, the inverse kinematic mode may be used to determine the two sets of angular displacements corresponding to the known current orientation and a known desired orientation of wrist output plate 32. The differences between the servo motor angular displacements for these two orientations may then be used to generate the commands to the three servo motors 6, 18, 20 to drive wrist output plate 32 from its current orientation to that desired orientation.

This scenario for applying the forward and inverse kinematic modes to control the operations of wrist 2 is a preferred embodiment of the wrist control method of the present invention. Those skilled in the art will understand that other scenarios are within the scope of the present invention. For example, wrist 2 may be operated entirely in the forward kinematic mode of the wrist control method to achieve cartesian motion.

It will be understood by those skilled in the art that the ranges and increments of the roll, yaw, and pitch angles and screw strut X-axis displacements described earlier are specific to wrist 2. It will also be understood that the stop criteria on the various iteration procedures are specific to wrist 2. Alternative embodiments of the wrist of the present invention may have different values for these ranges, increments, and stop criteria. These values may be determined empirically from the dimensions of the particular wrist invention embodiment.

It will further be understood by those skilled in the art that other alternative embodiments of the wrist are within the scope of the present invention. For example, a wrist having two screw drive servo motors, but no roll drive servo motor is within the scope of this invention. Such a wrist would provide motion at the wrist output in only the pitch and yaw directions. Such a wrist may be obtained by using wrist 2 of FIG. 1 while locking the roll drive servo motor at the home position of roll $\alpha$ angle 90 degrees.

It will be further understood that various changes in the details, materials, and arrangements of the parts that have been described and illustrated in order to explain the nature of this invention may be made by those skilled in the art without departing from the principle and scope of the invention as expressed in the following claims.

What is claimed is:

1. A method of determining the current orientation of the wrist output of a closed-loop robot wrist having at least one actuator, said actuator having a displacement sensor, comprising the steps of:
    (a) generating a look-up table having table orientation data corresponding to the orientation of said wrist output for specific table displacement values of the displacements of said actuator;

(b) generating displacement signals representative of the displacement of said actuator;
(c) selecting from said look-up table a set of table orientation data in accordance with said displacement signals; and
(d) determining said current orientation of said wrist output from said set of table orientation data.

2. The method of claim 1, wherein said step (d) comprises the step of using said set of table orientation data as said current orientation.

3. The method of claim 1, wherein said step (d) comprises the step of performing mathematical iteration to determine said current orientation of said wrist output from said set of table orientation data.

4. The method of claim 3, wherein said mathematical iteration comprises Newton-Raphson iteration.

5. The method of claim 3, wherein said step (d) comprises the further steps of:
(i) determining whether said mathematical iteration converges to said current orientation;
(ii) selecting, if said mathematical iteration does not converge to said current orientation, from said look-up table a second set of table orientation data; and
(iii) performing, if said mathematical iteration does not converge to said current orientation, mathematical iteration to determine said current orientation of said wrist output from said second set of table orientation data.

6. The method of claim 1, wherein said step (a) comprises the steps of:
(i) generating a preliminary look-up table containing approximate orientation data corresponding to the approximate orientation of said wrist output for specific table displacement values of the displacements of said actuator; and
(ii) performing mathematical iteration to determine said table orientation data from said approximate orientation data.

7. The method of claim 6, wherein said mathematical iteration comprises Newton-Raphson iteration.

8. A method of controlling the wrist output of a closed-loop robot wrist having at least one actuator, said actuator having a displacement sensor, comprising the steps of:
(a) generating a look-up table having table orientation data corresponding to the orientation of said wrist output for specific table displacement values of the displacements of said actuator;
(b) generating displacement signals representative of the displacement of said actuator;
(c) selecting from said look-up table a set of table orientation data in accordance with said displacement signals;
(d) determining said current orientation of said wrist output from said set of table orientation data; and
(e) controlling the orientation of said wrist output based on said current orientation.

9. The method of claim 8, wherein said step (d) comprises the step of using said set of table orientation data as said current orientation.

10. The method of claim 8, wherein said step (d) comprises the step of performing mathematical iteration to determine said current orientation of said wrist output from said set of table orientation data.

11. The method of claim 10, wherein said mathematical iteration comprises Newton-Raphson iteration.

12. The method of claim 10, wherein said step (d) comprises the further steps of:
(i) determining whether said mathematical iteration converges to said current orientation;
(ii) selecting, if said mathematical iteration does not converge to said current orientation, from said look-up table a second set of table orientation data; and
(iii) performing, if said mathematical iteration does not converge to said current orientation, mathematical iteration to determine said current orientation of said wrist output from said second set of table orientation data.

13. The method of claim 8, wherein said step (a) comprises the steps of:
(i) generating a preliminary look-up table containing approximate orientation data corresponding to the approximate orientation of said wrist output for specific table displacement values of the displacements of said actuator; and
(ii) performing mathematical iteration to determine said table orientation data from said approximate orientation data.

14. The method of claim 13, wherein said mathematical iteration comprises Newton-Raphson iteration.

15. A method for controlling the wrist output of a closed-loop robot wrist having at least one actuator, said actuator having a displacement sensor, comprising the steps of:
(a) generating an equivalent mechanical model having at least one mechanical link and corresponding to said closed-loop robot wrist;
(b) generating an equivalent open-loop mechanical model corresponding to at least one mechanical link of said equivalent mechanical model;
(c) generating, from said equivalent open-loop mechanical model, a preliminary look-up table containing approximate orientation data corresponding to the approximate orientation of said wrist output for specific table displacement values of the displacements of said actuator;
(d) performing mathematic iteration to determine, from said approximate orientation data, table orientation data corresponding to the orientation of said wrist output for said specific table displacement values;
(e) generating displacement signals representative of the displacement of said actuator; and
(f) performing kinematic analysis using said displacement signals and said table orientation data to control said wrist output.

16. The method of claim 15, wherein said mathematical iteration comprises Newton-Raphson iteration.

17. A method of controlling the wrist output of a closed-loop robot wrist having at least one actuator, said actuator having a displacement sensor, comprising the steps of:
(a) generating an equivalent mechanical model having at least one mechanical link and corresponding to said closed-loop robot wrist;
(b) generating an equivalent open-loop mechanical model corresponding to at least one mechanical link of said equivalent mechanical model;
(c) generating displacement signals representative of the displacement of said actuator; and
(d) performing kinematic analysis on said equivalent open-loop mechanical model and using said displacement signals to control said wrist output.

18. The method of claim 17, wherein said kinematic analysis comprises inverse kinematic analysis.

19. The method of claim 17, wherein said kinematic analysis comprises forward kinematic analysis.

20. The method of claim 15, wherein said kinematic analysis comprises inverse kinematic analysis.

21. The method of claim 15, wherein said kinematic analysis comprises forward kinematic analysis.

* * * * *

UNITED STATES PATENT AND TRADEMARK OFFICE
CERTIFICATE OF CORRECTION

PATENT NO. : 5,341,289
DATED : August 23, 1994
INVENTOR(S) : Jason J. Lee

It is certified that error appears in the above-indentified patent and that said Letters Patent is hereby corrected as shown below:

Column 17, line 15, delete "$a^6$" and insert therefor --$a_6$--.

Signed and Sealed this

Fourteenth Day of November, 1995

Attest:

BRUCE LEHMAN

Attesting Officer      Commissioner of Patents and Trademarks